US006404775B1

(12) United States Patent
Leslie et al.

(10) Patent No.: US 6,404,775 B1
(45) Date of Patent: Jun. 11, 2002

(54) BAND-CHANGING REPEATER WITH PROTOCOL OR FORMAT CONVERSION

(75) Inventors: Samuel A. Leslie, Goode; Donnie L. Goins, Lynchburg; William A. Bowen, Forest, all of VA (US)

(73) Assignee: Allen Telecom Inc., Solon, OH (US)

( * ) Notice: Subject to any disclaimer, the term of this patent is extended or adjusted under 35 U.S.C. 154(b) by 0 days.

(21) Appl. No.: 08/975,816

(22) Filed: Nov. 21, 1997

(51) Int. Cl.[7] .............................. H04J 3/22; H04Q 7/20; H04B 7/14
(52) U.S. Cl. ........................ 370/466; 370/315; 455/7; 455/20; 455/426
(58) Field of Search ........................ 455/7, 15, 16, 455/17, 20–22, 443, 426, 433, 422, 12.1, 13.1, 74, 313; 370/310, 320, 315, 316, 328, 336, 337, 345, 465, 466; 375/130

(56) References Cited

U.S. PATENT DOCUMENTS

| 5,640,386 A | * | 6/1997 | Wiedeman | 370/320 |
| 5,732,076 A | * | 3/1998 | Ketseoglou et al. | 370/347 |
| 5,878,343 A | * | 3/1999 | Robert et al. | 455/424 |

* cited by examiner

Primary Examiner—Wellington Chin
Assistant Examiner—Maikhanh Tran
(74) Attorney, Agent, or Firm—Michael Best & Friedrich, LLC

(57) ABSTRACT

A repeater allows terminals of a first communications system, employing a first air protocol or radio interface, to communicate with terminals of a second communications system, employing a second air protocol or radio interface different from the first. Where the first and second air protocols differ only in operating frequency, but are otherwise compatible, the repeater may linearly translate signals from the first operating frequency to the second operating frequency, and vice versa, without demodulating and remodulating the signals. Where the air protocols differ in other ways, the repeater receives and demodulates signals from the first system, converts the signals to a common format, and remodulates and retransmits the signals according to the second air protocol (and vice versa), in the same frequency bands or in different frequency bands. The repeater translates control and signalling information transmitted in compliance with one air protocol to a format which complies with the other air protocol and has the same or equivalent effect. For each of the two communications system, the repeater emulates the functions of a terminal in that communications system, so that corresponding terminals in that system may communicate transparently with the repeater. The repeater provides a connection between the two emulated terminals, thereby allowing a terminal of the first system to use the repeater to communicate with an otherwise incompatible terminal of the second system.

8 Claims, 11 Drawing Sheets

BAND-CHANGING REPEATER WITH PROTOCOL OR FORMAT CONVERSION

FIELD OF THE INVENTION

This application relates to wireless communications systems, and more particularly to repeaters for use in wireless telephone systems. Still more particularly, the application relates to repeaters for use with wireless telephone systems (or similar communications systems) having plural disparate radio interfaces differing in frequency band, format, or protocols, in which the repeater operates as a bridge to allow communication between components operating on such disparate interfaces.

BACKGROUND OF THE INVENTION

In 1983, conventional "analog" cellular telephone service became commercially available in several cities of the United States. This event marked the first time mobile telephone service was widely available to members of the general public. Although the concept of mobile telephony was not new, the systems which had been deployed previously in the United States were extremely limited in capacity. Prior to the advent of conventional cellular service, there were long waiting lists of persons desiring to subscribe to the existing systems, and service was very expensive. System capacity was so limited that subscribers desiring to make a call sometimes had to wait tens of minutes for a radio channel to become available.

"Cellular" systems (which term is used herein to refer to a family of mobile telephone services operating in the United States in the 824–849 MHz and 869–894 MHz frequency ranges) offer many advantages over prior mobile telephone systems. In particular, factors such as the large number of allocated radio channels, short RF path lengths, low subscriber terminal transmitter power requirements, and the ability of system operators to reuse channels within the system, combine to provide vastly greater system capacity and generally higher call quality. These factors also enable the use of hand-held telephones. In addition, service is available at relatively low cost. As a result, cellular telephone service has enjoyed great success, with consumer acceptance far exceeding what was expected by its original proponents.

Recently, the United States government has allocated radio spectrum in the 900 MHz range and in the 1.8 to 2.0 GHz range for construction of new communications systems referred to as "Personal Communications Services." Systems operating in the new PCS bands at 1.8–2.0 GHz are being installed throughout the United States at a rapid rate. Although PCS service vendors may ultimately support a variety of portable and/or mobile wireless communications and data applications, PCS systems are initially being deployed and marketed primarily as wireless telephone services operating in competition with 800 MHz cellular telephone systems.

The positioning of PCS as a competitor to cellular systems presents special challenges to PCS system operators, particularly during the initial period of system deployment. Cellular systems are relatively mature, and subscribers have learned to expect service to be available nearly everywhere they go. In many areas of the country it is not economically feasible to install PCS base stations and related infrastructure equipment due to the relatively lower population densities involved. Since some PCS providers may compete directly with wireline cellular providers, it may be difficult and expensive to obtain carrier facilities from local telephone companies to connect base stations to switching offices. Nonetheless, there will be PCS subscribers who desire service in these areas on a roaming basis.

Even in regions of relatively high population density, in many locations it may not be economically feasible to install PCS infrastructure equipment of conventional architecture during the early stages of PCS system implementation when subscriber demand is low. Due to the greater path attenuation at the higher frequencies which PCS systems use (i.e., 1.9 GHz as compared to 800 MHz for conventional cellular systems), and to lower transmitter power available from PCS subscriber units, a PCS base station provides a substantially smaller coverage area (or cell size) compared to an otherwise-equivalent 800 MHz base station. Therefore, PCS base stations (or equivalent radio transmitting and receiving facilities) must be installed with much greater geographic frequency than in equivalent 800 MHz cellular systems.

At least one cellular equipment manufacturer has implemented PCS cell sites using standard 800 MHz cell site base station equipment augmented with conventional components (e.g. amplifiers and mixers) for shifting the operating frequency to the 1.9 GHz PCS band. This approach to implementing a PCS cell site may be attractive to the equipment manufacturer because only a small amount of new equipment need be developed, and even that equipment is more or less conventional. Accordingly, the manufacturer need not expend the resources that otherwise would be required to develop a PCS cell site from scratch.

However, this approach is only available if the "air protocol" to be used in the PCS system is identical (except for operating frequencies) to that implemented by the existing cellular base station equipment. The terms "air protocol" and "radio interface" are used interchangeably herein to refer to the fundamental characteristics of the radio communications medium used by terminals to communicate with other terminals and may include, for example, operating frequency bands, signal modulation methods, the format for encoding voice or data traffic, formats for call set-up messages and other signaling, and other aspects of the communication protocol. In general, if the air protocol of two systems are different, the systems are fundamentally incompatible, and terminals of one system cannot directly communicate with the terminals of the other system. In the context of cellular and PCS communications systems, the air protocol is the protocol or format which a cellular or PCS base station uses to communicate with a subscriber terminal (such as a portable telephone), and are typically defined by industry or government specifications.

Several "air protocols" are available for use in PCS systems; all employ digital transmission formats. Some PCS air protocols are identical (except for operating frequencies) to air protocols used in 800 MHz cellular systems. For example, the aforementioned PCS cell site equipment, and the existing 800 MHz cell site equipment upon which it was based, were both designed to implement the U.S. standard TDMA air protocol, which is used in both 800 MHz cellular and PCS systems. However, other air protocols, which traditionally have not been used in 800 MHz cellular systems, may be preferable for use in PCS systems, because they may afford improvements in channel density, audio quality, bandwidth, noise immunity, features, or other parameters. If the air protocols of the cellular base station equipment and the PCS system are not compatible, merely adding equipment to change the operating frequency of the cellular base station equipment will not allow that equipment to function as a base station in the PCS system.

Moreover, constructing a PCS base station using cellular base station components of existing design may be advantageous to an equipment manufacturer, but it does not resolve several problems faced by the PCS system operator (including those related to economic feasibility) in initially deploying a relatively large number of PCS base stations when subscriber density is low. Compared to mature cellular systems, PCS subscriber density will likely be low system-wide during an initial period after the system is constructed. Subscriber density may remain low in some areas due to lower population density or demographic factors. In addition, due to propagation factors and lower subscriber unit transmitter power, the effective communication range in a 1.9 GHz PCS system is shorter. Therefore, even if the subscriber density were comparable, a 1.9 GHz PCS system would require a larger number of lower-capacity base stations than an equivalent 800 MHz cellular system, and would require the base stations be more uniformly distributed.

Since cellular base station equipment is generally designed for high density applications, use of modified cellular equipment in low-density PCS applications may have particularly onerous cost consequences to the PCS system operator. In addition, conventional base station equipment requires facilities to carry the cell traffic to the system operator's land-side network. These facilities are expensive to install and carry a high recurring charge. If the PCS operator does not operate a preexisting system (such as an 800 MHz cellular system) in the geographical area, the operator will have to invest as much in PCS cell sites as the 800 MHz cellular competitors, which already have established service and a customer base in the area.

However, it is expected that a number of PCS system operators may already operate an 800 MHz cellular system in the same market. If the PCS system operator installs complete PCS base stations the operator will essentially duplicate the investment already made in cellular base stations. Although in some cases the PCS base station may share a site (including power, environmental control, and back-haul transmission facilities) with the operator's 800 MHz PS cellular base station, the shorter range of the PCS system requires that some PCS base stations be installed at sites where no preexisting cellular base station exists. In addition, high-density cellular base stations are typically upgraded in large increments, and therefore, the system operator may already have excess capacity in 800 MHz base stations. Thus, it would be highly advantageous to PCS system operators if they were able to serve 1.9 GHz PCS subscribers using their existing investment in 800 MHz base stations and supporting infrastructure.

The problem of providing initial PCS service, at a time or in a geographical region in which subscriber demand is low, and where a preexisting, highly developed cellular system is available, may be seen as a special case of a more general problem: that of allowing subscribers of a first communications system which employs a first radio interface to access a second communications system which employs a second radio interface which is incompatible because of differences between the two in an operating characteristic. Several different trunked radio systems are commercially available, but because these systems employ different radio interfaces (or air protocols), equipment designed for different systems will not interoperate.

OBJECTS AND SUMMARY OF THE INVENTION

It is therefore an object of the present invention to provide a system for enabling terminals of a first communication system employing a first radio interface to communicate with terminals of a second communication system employing a second, incompatible, radio interface.

It is another object of the present invention to provide a system for enabling subscriber units of a first communication system employing a first radio interface to communicate with base stations of a second communication system employing a second, incompatible, radio interface.

It is a further object of the invention to provide a system for enabling a PCS mobile or portable unit to access a base station of a cellular communications system.

It is another object of the invention to provide a bidirectional repeater having a first terminal for communicating with components of a first communications system and a second terminal for communicating with components of a second communications system, thereby enabling communications between components of the first and second communications, wherein the components of the first and second communications systems are otherwise incompatible.

It is a further object of the invention to provide a bidirectional repeater having a terminal for communicating with components of a cellular communications system and a second terminal for communicating with components of PCS communications system, thereby enabling transparent communication between components of the cellular and PCS systems.

According to the present invention, a repeater is provided to allow communication between terminals, subscriber units, or other components of two or more communications systems having non-identical radio interfaces.

According to a first aspect of the invention, a first embodiment is provided in the form of a frequency translating repeater which is adapted for use in applications in which the first and second communications systems employ compatible air protocols but operate at different frequencies. The first embodiment may be used, for example, to permit subscriber terminals (i.e., portable telephones) designed to operate in a 1.9 GHz TDMA PCS system to communicate with base stations of an 800 MHz TDMA cellular system. The frequency translating repeater (also called an "up-banding" repeater) comprises first means for translating the frequency of forward-signal-path signals, second means for translating the frequency of reverse-signal-path signals, means for measuring the signal strength of received signals and responsively controlling signal path gain to optimum levels, means for extracting timing information from signals on at least one of the signal paths, and means for responsively gating the output of at least one signal path of the repeater such that the repeater only transmits when required In the aforementioned exemplary application, the first translation means receives signals transmitted by the base station in the 800 MHz band and linearly translates the signals to the 1.9 GHz band for retransmission to 1.9 GHz subscriber units ("mobiles"). The second translation means receives signals transmitted by mobiles in the 1.9 GHz band and linearly translates the signals to the 800 MHz band for retransmission to the 800 MHz base station. The repeater measures the received signal strength on each path and adjusts the path gain as needed to provide optimum signal levels at the base station and the mobile. In a TDMA application, the forward signal path is demodulated to recover the time slot timing transmitted by the base station. The repeater uses the time slot timing (adjusted as required for repeater-to-mobile propagation delay) to gate the reverse signal path, such that the path is enabled only during time slots occupied by a mobile operating through the repeater. This gating minimizes interference to communications which are not operating through the repeater. Since the TDMA air protocol used in 800 MHz cellular systems is compatible with that used in 1.9 GHz PCS systems (except for operating frequency), signals from the 800 MHz base station, once translated upward in frequency by the repeater, are compatible with the 1.9 GHz PCS mobiles. Similarly, signals from the 1.9 GHz PCS mobiles, once translated downward in frequency by the repeater, are compatible with the 800 MHz base station.

According to a second aspect of the invention, a second embodiment is provided in the form of a protocol converting repeater which is adapted for use in applications in which the first and second communications systems employ substantially incompatible air protocols. The repeater typically also provides frequency conversion between the operating frequencies of the two systems. The second embodiment may be used, for example, to permit subscriber terminals (i.e., portable telephones) designed to operate in a 1.9 GHz GSM PCS system to communicate with base stations of an 800 MHz TDMA cellular system. The GSM and TDMA air protocols are substantially different. As another example, the second embodiment could be used to permit subscriber terminals designed to operate in a 1.9 GHz TDMA PCS system to communicate with base stations of an 800 MHz "analog" cellular system. The TDMA and "analog" cellular air protocols are also substantially different; although signaling formats may be similar, they are not necessarily identical, and the differing formats of voice information between the two protocols makes format conversion necessary.

The protocol conversion repeater comprises a first means for communicating with a first communications system employing a first air protocol and for emulating a terminal of the first communications system, a second means for communicating with a second communications system employing a second air protocol and for emulating a terminal of the second communications system, means for transferring message traffic between the first and second communication and emulation means, and control means for supervising the operations of the communication and emulation means and for transferring, responsive to the respective air protocols of each communications system, information required to establish a message traffic connection between the first and second communications systems.

In the aforementioned exemplary application, the first communications and emulation means communicates with an existing 800 MHz cellular base station, faithfully emulating the functions and behavior of an 800 MHz TDMA cellular subscriber terminal ("mobile"). The second communications and emulation means communicates with a 1.9 GHz GSM PCS subscriber terminal, faithfully emulating the functions and behavior of a 1.9 GHz GSM PCS base station.

The first and second communications means are suitably interconnected to transfer message traffic (e.g., voice telephone signals) and signalling or control traffic (e.g., call set-up and supervisory messages) between the two communications systems. In general, this requires that both message traffic and signaling traffic originating in each communications system be received, demodulated, reformatted as required for the target system, remodulated, and retransmitted in the opposite system. For example, because the TDMA and GSM voice encoding formats differ, a conversion of the voice signal information across the formats is required. This may be accomplished by causing each of the first and second communications means to convert the message traffic (i.e., voice telephone signals) to a common format, and then to reconvert the message traffic to the format of the respective target system.

The control and signalling information required by various air protocols differ substantially. In addition, the protocols are subject to severe timing and other constraints. Accordingly, in general, the control information sent by a terminal in one system typically cannot be simply passed along to a terminal in the other system. The control means supervises each of the communications and emulation means and converts or modifies as necessary the control or signalling information received from one system will have the appropriate effect in the other system. In particular, the control means and the communications and emulation means cooperate as needed to establish, maintain, and terminate voice traffic connections between the 800 MHz TDMA cellular base station and the 1.9 GHz GSM PCS mobiles. For example, if the protocol conversion repeater receives from the 800 MHz TDMA cellular system a page intended for a mobile operating in the 1.9 GHz GSM PCS system, the control means causes the second communications and emulation means to format and transmit a suitable GSM page message for reception by the 1.9 GHz GSM mobiles. Other call processing messages would be similarly converted.

The inventive repeater may be co-located with a base station of the donor system (such as an 800 MHz cellular base station). However, because the range of PCS systems is often shorter than that of 800 MHz cellular systems, and therefore more PCS cells are required, the repeater will normally be in a location which is remote from the donor base station and in which PCS coverage is desired.

BRIEF DESCRIPTION OF THE DRAWINGS

These and other features of this invention will be best understood by reference to the following detailed description of a preferred embodiment of the invention, taken in conjunction with the accompanying drawings, in which.

DETAILED DESCRIPTION OF THE PREFERRED EMBODIMENT

FIGS. 1–11 generally show preferred embodiments of a repeater constructed according to the present invention for allowing communications between terminals of first and second wireless communications systems, wherein the communications systems have non-identical air protocols or radio interfaces. Although the present invention is described in the exemplary environment of wireless communications systems typically used to provide mobile telephone service, the invention is broadly applicable to a wide variety of communications systems.

FIGS. 1 and 3–5 show a first preferred embodiment of a repeater constructed according to an aspect of the present invention, for use in applications in which the first and second communications systems operate in different frequency bands, but employ otherwise identical or compatible air protocols. FIGS. 2 and 6–11 show a second preferred embodiment of a repeater constructed according to another aspect of the present invention, for use in applications in which the first and second communications system employ incompatible air protocols.

Figure 1:
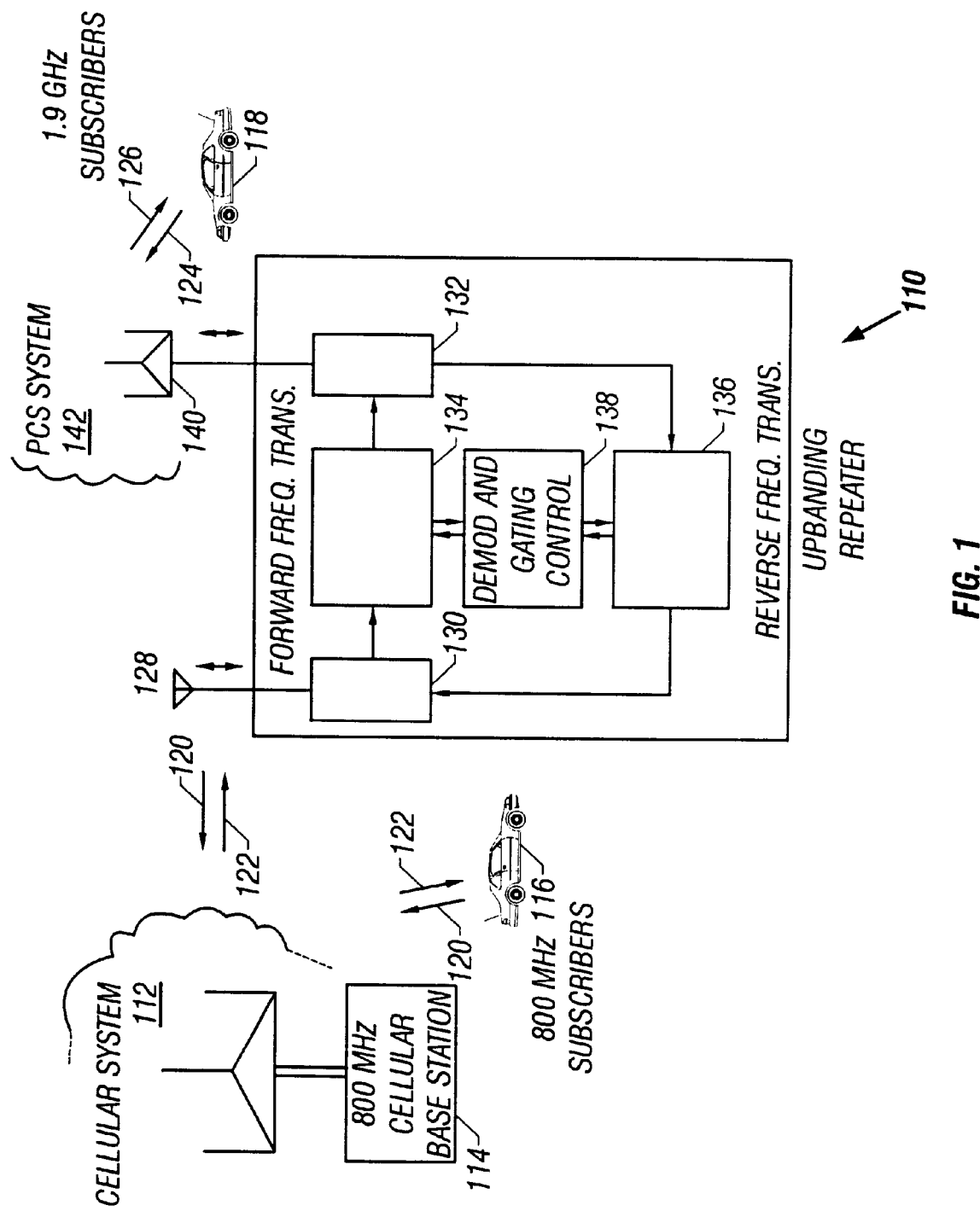
FIG. 1 is a simplified block diagram showing a repeater constructed according to a first embodiment of the present invention as it might be applied to allow communications terminals of a first communications system with terminals of a second, dissimilar communications system, in which the first and second communications systems are selected for exemplary purposes to be a conventional 800 MHz TDMA cellular system and a 1.9 GHz TDMA PCS system.
Figure 3:
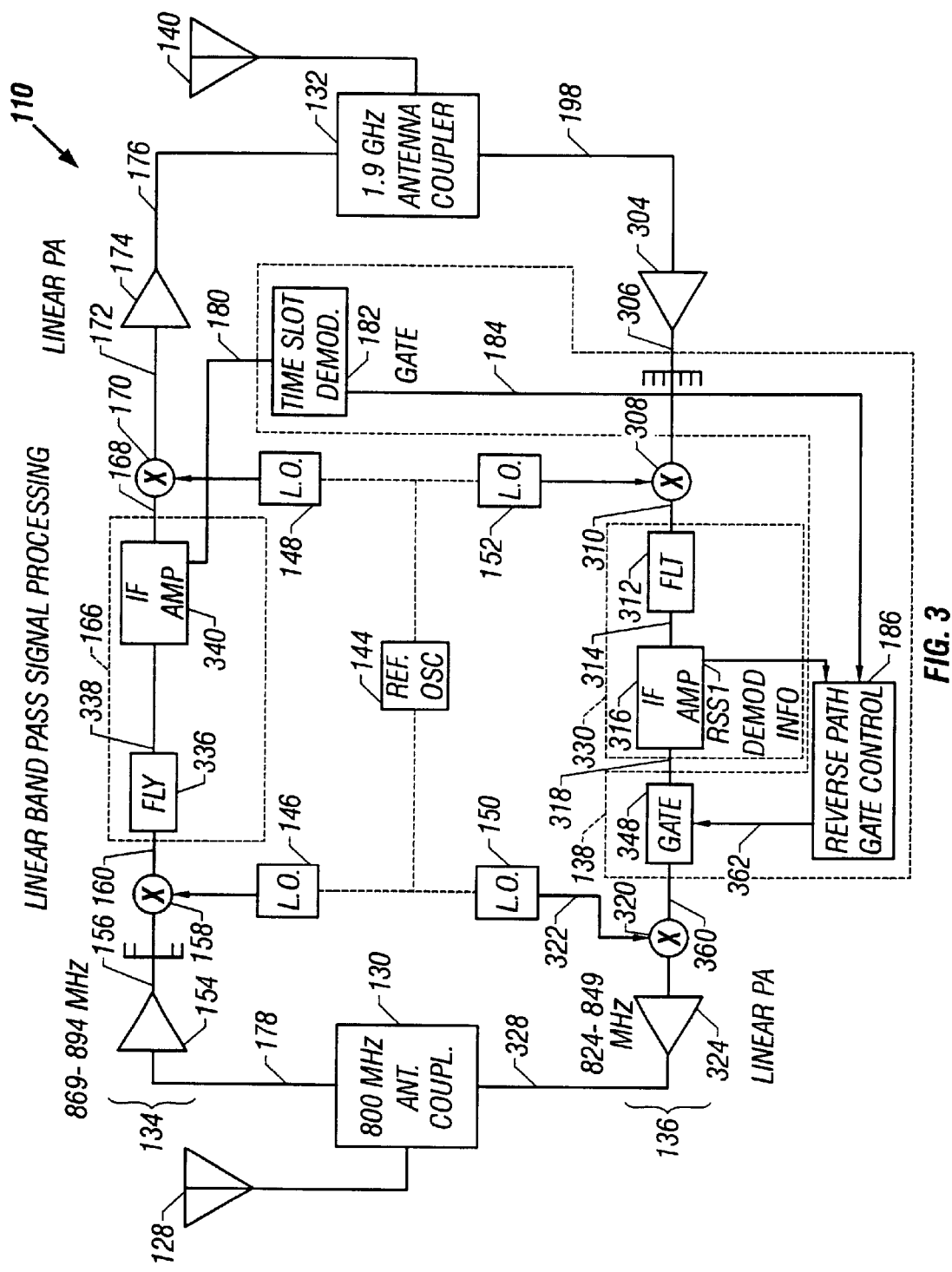
FIG. 3 is a block diagram showing the construction of a repeater according to the first embodiment, as depicted in FIG. 1.

As best seen in FIGS. 1 and 3, a first preferred embodiment of the invention comprises a frequency-translating repeater 110 adapted for bidirectional communications with terminals of first and second communications systems 112 and 142 respectively, which operate in different frequency bands or groups. The repeater functions to permit terminals of one communications system to communicate with terminals of the other communications system, where such terminals would not otherwise be able to communicate because the respective terminals operate on different frequencies.

In an exemplary application, the first communications system 112 may be a TDMA cellular system operating in the 800 MHz band, and the second communications system 142 may be a TDMA PCS system operating in the 1.9 GHz band. In this application, the frequency-translating repeater 110 is preferably constructed to permit subscriber terminals 118 of the 1.9 GHz PCS system 142 to communicate with one or more base station terminals 114 of the 800 MHz TDMA cellular system 112. However, the frequency-translating repeater 110 may also be used in conjunction with communications systems which do not distinguish between subscriber and base terminals. Subscriber terminals in cellular, PCS, and many other radio communications systems historically have been installed in vehicles, but are now often be implemented in hand-held, portable, or fixed configurations. When the term "mobile" is used herein, it is intended to refer generally to a subscriber terminal regardless of whether it is used in a mobile, portable, or fixed application.

Although in the exemplary application, the respective frequencies of each of the systems 112 and 142 are substantially different, the inventive frequency-translating repeater 110 could be advantageously employed in any application in which the terminals of the two systems are not equipped to operate on the same frequencies. Thus, in other applications, the frequencies of the two systems might actually be close to or interspersed with one another. Moreover, the term "system" as used herein refers to one or more terminals adapted for communications according to a predetermined air protocol or radio interface, but is not intended to imply that the infrastructure normally used to implement such systems is necessarily present. In particular, although reference is made to a 1.9 GHz PCS "system" 142, no 1.9 GHz PCS base stations need be present, and it is the function of the inventive frequency-translating repeater 110 to service 1.9 GHz mobiles 118 in locations where such base stations are not available.

The frequency-translating repeater 110 is located in an area in which it is desired to provide services to 1.9 GHz mobiles 118, and in which the repeater 110 may communicate with an 800 MHz TDMA cellular base station 114. The cellular base station 114 is sometimes referred to as the "donor" because it donates some of its capacity to serve 1.9 GHz mobiles 118 through the repeater 110. The 800 MHz TDMA cellular base station 114 transmits on one or more forward (base-station-to-mobile) channels 122 and receives on one or more reverse (mobile-to-base-station) channels 120 allocated in the 800 MHz cellular band. 800 MHz mobiles 116 receive on the forward channels 122 and transmit on the reverse channels 120. The frequency-translating repeater 110 also receives on the forward channel 122 and transmits on the reverse channel 120, so that from the perspective of the 800 MHz TDMA cellular base station 114 the repeater 110 appears as an 800 MHz mobile.

For each repeated channel, the repeater 110 transmits on a corresponding forward (base-station-to-mobile) channel 126 and receives on a reverse (mobile-to-base-station) channel 124 allocated in the 1.9 GHz PCS band. Mobiles 118 operating in the 1.9 GHz PCS system 142 in the coverage area of the repeater 110 receive on the forward channels 126 and transmit on the reverse channels 124. Thus, from the perspective of 1.9 GHz mobiles 118, the repeater 110 appears as a 1.9 GHz PCS base station.

The repeater 110 preferably comprises suitable linear frequency translation means 134, 136 (discussed further in greater detail) for each repeated channel so that transmissions received from the 800 MHz TDMA cellular base station 114 are retransmitted on the corresponding 1.9 GHz band channel to 1.9 GHz mobiles 118, and transmissions received from the 1.9 GHz mobiles 118 are retransmitted on the corresponding channel in the 800 MHz band to the cellular base station 114. Because both the 1.9 GHz mobiles 118 and the 800 MHz TDMA cellular base station 114 use the identical air protocols (except for operating frequencies) communications may be established between the base station 114 and the mobiles 118 without requiring the repeater 110 to modify control and signalling information exchanged between the mobile and the base station.

In the TDMA air protocol, channels are assigned by number. If every channel on which the 800 MHz TDMA cellular base station 114 operates were translated to the corresponding 1.9 GHz PCS channel, the repeater 100 may operate entirely transparently to both the 800 MHz TDMA cellular base station 114 and the 1.9 GHz mobiles 118. However, there are more available channels allocated in the 1.9 GHz PCS band, and due to differences in subscriber demand, it may not be desirable to provide the same number of channels in the repeater 110 as are provided in the base station 114. In that case, small modifications to the control system of the base station 114 may be made to enable the base station 114 to be aware of which 800 MHz cellular channels are available to be repeated by the repeater 110, and to manage those channels as a separate group. The base station 114 would assign conversations with PCS mobiles 118 only to channels repeated by the repeater 110. The base station 114 may also attempt to avoid assigning normal cellular conversations to repeated channels to keep those channels available for PCS conversations. These minor changes to the control system 114 would eliminate the need for exact correspondence between the 800 MHz cellular channel number and the 1.9 GHz PCS channel number, and would allow the PCS operator to equip the repeater with only as many channels as are needed to provide service demand among PCS customers.

As best seen in FIGS. 1 and 3, the frequency-translating repeater 110 preferably comprises an 800 MHz-band antenna 128, an 800 MHz-band antenna coupling means 130, a 1.9 GHz antenna 140, a 1.9 GHz antenna coupling means 132, means 134 for frequency-translating the forward (base-station-to-mobile) signal path ("forward translation means"), means 136 for frequency-translating the reverse (mobile-to-base-station) signal path ("reverse translation means"), and means 138 for demodulating the forward signal path and controlling and gating the output of the reverse translation means 136 such that the reverse translation means 136 transmits only at appropriate times and at appropriate output levels. FIGS. 1 and 3 depict a single forward translation means 124, a single reverse translation means 136, and a single demodulation and gating means 138, which are suitable for bidirectionally repeating one full-duplex RF channel pair. However, the forward translation means 124, reverse translation means 136, and demodulation and gating means 138 (or selected parts of them), are preferably replicated as necessary to achieve the desired repeater capacity. Where TDMA is the air protocol being employed by the two systems, at least two channel pairs would be required (one carrying control/signalling information and one carrying voice conversations or other user traffic).

The 800 MHz-band antenna 128 is preferably connected via suitable transmission lines to an 800 MHz-band antenna coupling means 130, which may be used to couple the antenna 128 to the several forward translation means 134 (effectively, receivers), and to the several reverse translation means 136 (effectively, transmitters). A 1.9 GHz antenna coupling means 132 is preferably provided to couple the forward translation means 134 and reverse translation means 136 to a 1.9 GHz-band antenna 140 (using suitable transmission lines). The antenna coupling means 130, 132 may be constructed from conventional antenna coupling components, such as duplexers, multicouplers, and the like, as is known in the art. For simplicity, a single omnidirectional antenna is shown for use in each band. As is known in the art, separate antennas may be used for transmitting and receiving, and separate directional antennas may be used to divide the area covered by the repeater into several sectors; these techniques may be combined in various ways.

Each forward translation means 134 preferably comprises suitable signal processing elements for providing linear frequency translation of signals received on at least on, but possible several, designated channels from the 800 MHz band to the 1.9 GHz band. Unless otherwise specified, the signal processing elements may be of any suitable construction, the design of such elements being well known in the art. 800 MHz signals are provided on a signal path 178 to a suitable buffer amplifier 154. Amplified 800 MHz signals are supplied on signal path 156 to a mixer 158. Mixer 158 also receives a local oscillator signal from a suitable local oscillator 146. The frequency of local oscillator 146 is selected to provide an output from mixer 158 at a predetermined intermediate frequency (IF), such as 70 MHz, for further processing. Although the IF may be chosen from a wide range, frequencies in the range 0–400 MHz are believed to be most suitable because signal processing components for such frequencies can be economically manufactured or obtained from commercial suppliers.

The repeater 110 preferably includes a suitable reference oscillator 144 for supplying a frequency reference signal to local oscillator 146 (and to local oscillators 148, 150, and 152 (discussed further in detail)), from which the local oscillator 146 output signal may be derived using known frequency synthesis and multiplier techniques. A single reference oscillator 144 may be used to serve all local oscillators in the repeater. Government regulations and operational characteristics of cellular and PCS air protocols impose severe constraints on operating frequencies and timing signals derived from the reference signal. Accordingly, the reference oscillator 144 is preferably a high-stability ovenized or temperature-compensated oscillator; such oscillators are widely commercially available.

The output signal of mixer 158 is provided on signal path 160 and consists of received 800 MHz signals shifted (translated) in frequency to the IF passband, with received signals corresponding to the center of the selected input frequency range of the forward translation means 134 preferably shifted to the center of the selected IF passband. The mixer output signal is provided to an IF filter and gain control block 166.

Figure 5:
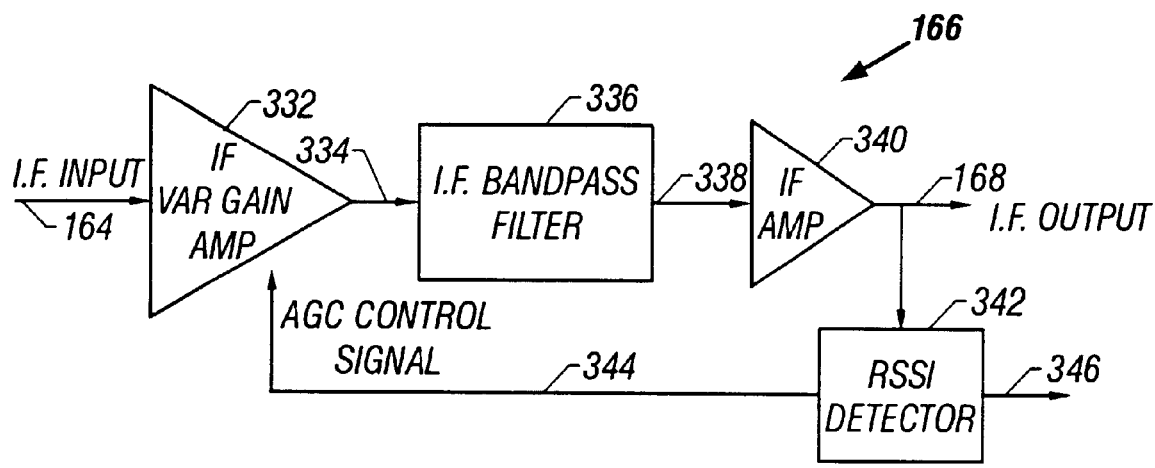
FIG. 5 is a block or diagram showing an intermediate frequency filter and gain control arrangement for use with the repeater of FIG. 3.

IF filter and gain control block 166 limits the IF passband, thereby rejecting signals at frequencies outside the selected input frequency range, detects the strength of the IF signal, and adjusts the level of the IF signal to a desired level. FIG. 5 is a block diagram showing a suitable design for the filter and gain control block 166. As best seen in FIG. 5, block 166 preferably receives an IF signal (from mixer 158) on signal path 160. The IF signal is provided to a variable gain amplifier 332, the gain of which is controlled by an automatic gain control (AGC) signal provided on signal path 344. The output of the amplifier 332 is provided on signal path 334 to an IF bandpass filter 336. The filter 336 limits the bandwidth of the IF signal to that required to pass the desired signal. The IF filter 336 bandwidth may be selected for a single signal (i.e. 30 KHz wide for a single TDMA signal, or 200 KHz wide for a GSM signal), or it may be a selected to accommodate several signals at the same time. Filter 336 may be of any conventional design.

The output of filter 336 is provided on signal path 338 to an IF output and buffer amplifier 340. Amplifier 340 amplifies the filtered IF signal to a level needed for subsequent mixing. The output of amplifier 340 is provided on signal path 168 to mixer 170 (FIG. 3). In addition, the output is also provided to a received signal strength indication (RSSI) detector 342. The RSSI detector 342 uses the IF signal to derive an indication of the signal strength of the received signal, and produces a responsive automatic gain control (AGC) signal on signal path 344. The AGC signal is used to control the gain of amplifier 332 to maintain the IF signal at normal levels. In addition the RSSI detector 342 provides an RSSI signal on lead 346 for use by other elements of the repeater. In particular, the RSSI detector may be used, in part, to enable transmission of signals by the forward translation means 134 only when a signal is received from the 800 MHz TDMA cellular base station 114 on the channel, indicating that the channel is active.

Mixer 170 receives the output of the IF filter and gain control block 166 on signal path 168, and a local oscillator signal from a second local oscillator 148. The second local oscillator frequency is selected such that when mixed with the IF signal, the resulting output frequency corresponds to the desired output frequency for the forward translation means 134 in the 1.9 GHz band. The second local oscillator frequency may be derived from a frequency reference signal obtained from reference oscillator 144. The output of the mixer is supplied on signal path 172 to a linear power amplifier 174. Amplifier 174 amplifies the 1.9 GHz mixer output to a level needed to communicate with 1.9 GHz mobile 118. The output of amplifier 174 is supplied to the 1.9 GHz-band antenna coupling means 132 via signal path 176, and is transmitted by 1.9 GHz-band antenna 140.

The reverse translation means 136 is constructed in a manner similar to the forward translation means 134, with some variations. Accordingly, the reverse translation means 136 will be discussed in somewhat less detail as to those aspects it shares with the forward translation means 134, but a detailed explanation will be provided in those areas where differences occur.

Each reverse translation means 136 preferably comprises suitable signal processing elements for providing linear frequency translation of signals received on at least one, but possibly several, designated channels from the 1.9 GHz band to the 800 MHz band. Unless otherwise specified, the signal processing elements may be of any suitable construction, the design of such elements being well known in the art. 1.9 GHz signals received by 1.9 GHz-band antenna 140 pass through antenna coupler 132 and are provided on a signal path 198 to a suitable buffer amplifier 304. Amplified 1.9 GHz signals are supplied on signal path 306 to a mixer 308. Mixer 308 also receives a local oscillator signal from a suitable local oscillator 152. The frequency of local oscillator 152 is selected to provide an output from mixer 308 at a predetermined intermediate frequency (IF), such as 70 MHz, for further processing. Although the IF may be chosen from a wide range, frequencies in the range 0–400 MHz are believed to be most suitable because signal processing components for such frequencies can be economically manufactured or obtained from commercial suppliers. Local oscillator 152 preferably-derives its output signal using a frequency reference signal from reference oscillator 144.

The output signal of mixer 308 is provided on signal path 310 and consists of received 1.9 GHz signals shifted (translated) in frequency to the IF passband, with received signals corresponding to the center of the selected input frequency range of the reverse translation means 136 preferably shifted to the center of the selected IF passband. The mixer output signal is provided to an IF filter and gain control block 330.

IF filter and gain control block 330 limits the IF passband, thereby rejecting signals at frequencies outside the selected input frequency range, detects the strength of the IF signal, and adjusts the level of the IF signal to a desired level. A suitable design (see FIG. 5) for the filter and gain control block has been discussed previously in connection with the forward translation means 134. The IF signal is received from mixer 308 on signal path 310. The IF signal is provided to a variable gain amplifier (not shown), the gain of which is controlled by an automatic gain control (AGC) signal derived from a measurement of the received signal strength, and the amplified result is provided to IF bandpass filter 312. The filter 312 limits the bandwidth of the IF signal to that required to pass the desired signal. The IF filter 312 bandwidth may be selected for a single signal (i.e. 30 KHz wide for a single TDMA signal, or 200 KHz wide for a GSM signal), or it may be a selected to accommodate several signals at the same time. Filter 312 may be of any conventional design.

The output of filter 312 is provided on signal path 314 to an IF output and buffer amplifier 316. Amplifier 316 amplifies the filtered IF signal to a level needed for subsequent mixing.

For some air protocols, including TDMA and GSM, reverse-channel time slot assignments may be mixed among both repeated and non-repeated mobiles. When such air protocols are in use, the frequency-translating repeater 110 must transmit only during active time slots assigned to repeated mobiles, and the repeater's transmissions must be closely synchronized with the timing of the donor cell 114 to avoid interference with transmissions of non-repeated mobiles. The frequency-translating repeater 110 preferably includes a demodulation and gating means 138 (discussed further in greater detail) to control the output of at least the reverse translation means 136 such that a signal is transmitted only when a signal is actually being received from a mobile during a time slot assigned to a conversation by the 800 MHz base station 114. The demodulation and gating control means 138 includes a reverse path gate means 348 and a reverse path gate controller 186 which are associated with the reverse IF signal path. The output of amplifier 316 is preferably provided on signal path 318 to the reverse path gate means 348. The reverse path gate means 348 controls transmission of the output signal by the reverse signal path frequency translation means 136 so that transmission occurs only during active time slots in which a repeatable reverse-path signal is received from a mobile 118. The reverse path gate means 348 receives a gate control signal on signal path 352 from the reverse path gate controller 186. The reverse path gate means 348 may operate using any appropriate method for gating transmission. For example, the reverse path gate means 348 may reduce the gain of a component in the IF chain below a threshold level, thereby preventing further propagation of the IF signal through the IF chain and inhibiting transmission of an output signal. Other gating methods are known in the art and could also be used.

The reverse path gate controller 186 generates the gate control signal 352 using a reverse-path time slot synchronization signal received on signal path 184 (discussed further in greater detail) and an amplified reverse-path IF signal received from IF amplifier 316 on signal path 190. The reverse-path IF signal 190 may be used to determine whether a repeatable signal is being received from a mobile by measuring the strength of the signal, or by demodulating the signal to detect whether valid data is being received, or both. (See FIG. 4, which is discussed further in greater detail.)

Mixer 320 receives a local oscillator signal on signal path 322 from a second local oscillator 150, and an amplified reverse-path IF signal on lead 350 from reverse path gate means 348. If gate means 348 is not present, the amplified reverse-path IF signal is received from IF filter and gain control block 330. The second local oscillator frequency is selected such that when mixed with the IF signal, the resulting output frequency corresponds to the desired output frequency for the reverse translation means 136 in the 800 MHz band. The second local oscillator frequency may be derived from a frequency reference signal obtained from reference oscillator 144. The output of the mixer 320 is supplied on signal path 322 to a linear power amplifier 324. Amplifier 324 amplifies the 800 MHz mixer output to a level needed to communicate with the 800 MHz TDMA cellular base station 114. The output of amplifier 324 is supplied to the 800 MHz-band antenna coupling means 130 via signal path 328, and is transmitted by 800 MHz-band antenna 128.

As best seen in FIG. 3, a demodulation and gating means 138 is provided to control the output of at least the reverse translation means 136 such that a signal is transmitted only when a signal is actually being received from a 1.9 GHz PCS mobile during a time slot assigned to a conversation by the 800 MHz base station 114. If the 800 MHz base station 114 is not actively conversing with a mobile on the forward path during a particular time slot, then any signals received on the reverse path during that time slot are spurious and should not be repeated. In addition, even if a particular time slot is active, that time slot may be occupied by an 800 MHz cellular mobile, rather than a 1.9 GHz PCS mobile. Thus, to avoid interference, the repeater 110 must inhibit transmission even during active time slots unless a valid signal is being received during that time slot from a 1.9 GHz PCS mobile.

Although FIG. 1 shows a bidirectional signal path between the forward signal path frequency translation means 134 and the demodulation and gating control means 138, for many air protocols, it is not necessary to gate the forward RF signal path in close synchronism with the timing of the donor system. In general, only one repeater or base station within a cell is expected to be active on a particular channel, and therefore, interference with another repeater or base-station within that cell and within the intended coverage area of the repeater is unlikely. Moreover, for many air protocols, including TDMA, when a channel is active, the base station transmits even during timeslots which are not in use. Accordingly, in such systems, the demodulation and gating control means 138 need only control gating of the reverse signal path. In that case, transmission by forward signal path frequency translation means 134 may be controlled by detecting whether a carrier is present on the channel at a level which exceeds a predetermined threshold that corresponds to the minimum signal strength expected from the donor cellular base station 114. However, if gating is deemed desirable on the forward path, the demodulation and gating means 138 may be replicated for use in controlling the output of the forward translation means 134.

The demodulation and gating means 138 receives the forward-path IF signal on signal path 180. A time slot demodulator 182 demodulates the signal received from the 800 MHz base station 114 and extracts time slot information, including time slot synchronization and information as to which time slots are active. The time slot demodulator 182 adds a timing offset to match the timing of signals expected from the mobile. The time slot demodulator 182 produces a reverse-path time slot synchronization signal 184 signal on signal path 184 which is supplied to reverse path gate means 348 in the IF chain to gate or enable the propagation of the received signal through the IF chain only during reverse-channel time slots expected to be active. Reverse path gate controller 186 analyzes the received reverse-path signal to ensure that the signal strength is sufficient and that valid data is present, thus indicating that a signal from a 1.9 GHz PCS mobile 118 is present. Reverse path gate controller 186 produces a gate control signal on signal path 352 which is supplied to the reverse path gate means 348 in the IF chain to gate or enable the propagation of the received signal through the IF chain only when a valid signal is actually received from a 1.9 GHz PCS mobile 118.

Figure 4:
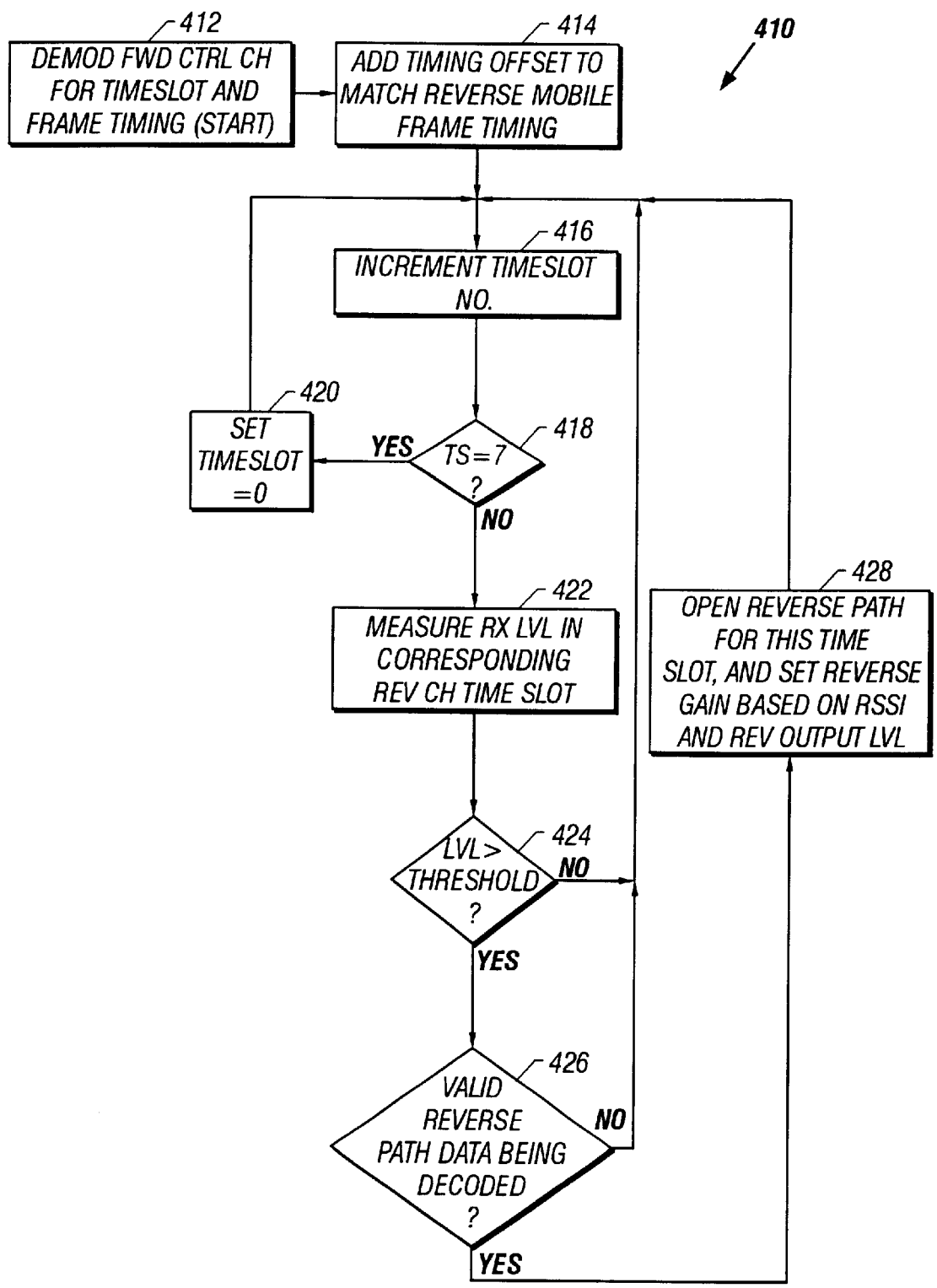
FIG. 4 is a block or flow diagram showing a method for controlling components of the repeater of FIG. 3, in order to provide repeater output gating and to control the repeater output level, thereby minimizing interference to other system traffic.

FIG. 4 is a flow diagram showing a method 410 for use in conjunction with the demodulation and gating control means 138 for controlling the repeater's reverse-path output signal (and optionally, the forward-path output signal). The method may be implemented using programmable microprocessors, "hard-wired" digital logic, or any other appropriate means. Initially, it is assumed that the reverse-path output signal is disabled at the beginning of each time slot. In step 412, the forward control channel is demodulated to determine the synchronization of timeslot and framing signals transmitted by the 800 MHz TDMA cellular base station 114. In step 414, the timing information recovered from the forward control channel is adjusted by an offset to match the timing of signals transmitted by mobiles on reverse channels.

In step 416, an internal counter representing the timeslot number is incremented. In TDMA systems, time slots are numbered 1–6. In step 418, a test is made to determine whether the current value of the timeslot counter equals 7. If the test is successful, the method continues in step 420, in which the timeslot counter is reset to 0. Next, step 416 is executed again, incrementing the timeslot counter to 1. If, in step 418, the timeslot counter is not equal to 7, the method continues at step 422. In step 422, the level of the signal on the reverse channel during the corresponding reverse channel time slot is measured.

In step 424, the received signal level is compared to a predetermined threshold. If the signal level does not exceed the threshold, the repeater concludes that no mobile within its coverage area is transmitting on the channel of interest during the current time slot, and therefore, the reverse-path output signal remains disabled, and the method jumps back to step 416 to process the next time slot. If, in step 424, the received signal level exceeds the threshold, then a mobile may be present and occupying the current time slot. The method continues in step 426, whether data from the mobile is demodulated and checked for validity. If valid data is being decoded, then a mobile is assumed to be within the coverage area of the repeater. Accordingly, the method jumps to step 428. The output signal of the reverse translation means 136 is enabled for that time slot. In addition, the reverse-path gain is selected based on the received signal level from the mobile, and the output level of the reverse translation means 136. The gain is selected to present a signal to the 800 MHz TDMA cellular base station 114 of approximately the same level or strength as that received from the 1.9 GHz mobile 118 by the frequency-translating repeater 110. This allows the 800 MHz TDMA cellular base station 114 to effectively measure the signal strength of the mobile Em and to responsively control the output power of the mobile by sending control messages transparently through the repeater. If the mobile signal strength were not accurately presented to the 800 MHz TDMA cellular base station 114, then the frequency-translating repeater 110 would be required to actively manage the mobile output power.

If, in step 426, it is determined that valid data is not being decoded, then the repeater concludes that no mobile within its coverage area is transmitting on the channel of interest during the current time slot, and therefore, the reverse-path output signal remains disabled, and the method jumps back to step 416 to process the next time slot.

The demodulation and gating control means 138 has been described in a form appropriate for use in connection with cellular and PCS systems employing the TDMA air protocol. One of skill in the art will appreciate how the demodulation and gating control means 138 may be modified to accommodate other air protocols or radio interfaces. In particular, another method of determining whether to repeat a received signal is to measure the amount of signal power that is present within the IF bandwidth. A threshold signal power would be established corresponding to some level above the noise floor of the channel (i.e., the signal power measured when no mobile is present). Measured signal power exceeding the threshold would indicate that a mobile is transmitting. This method would be particularly useful for spread-spectrum signals such as those employed in the 1.25 MHz-wide U.S. CDMA air protocol. The method could also be useful for other modulation formats such as TDMA, GSM, and DECT.

Figure 2:
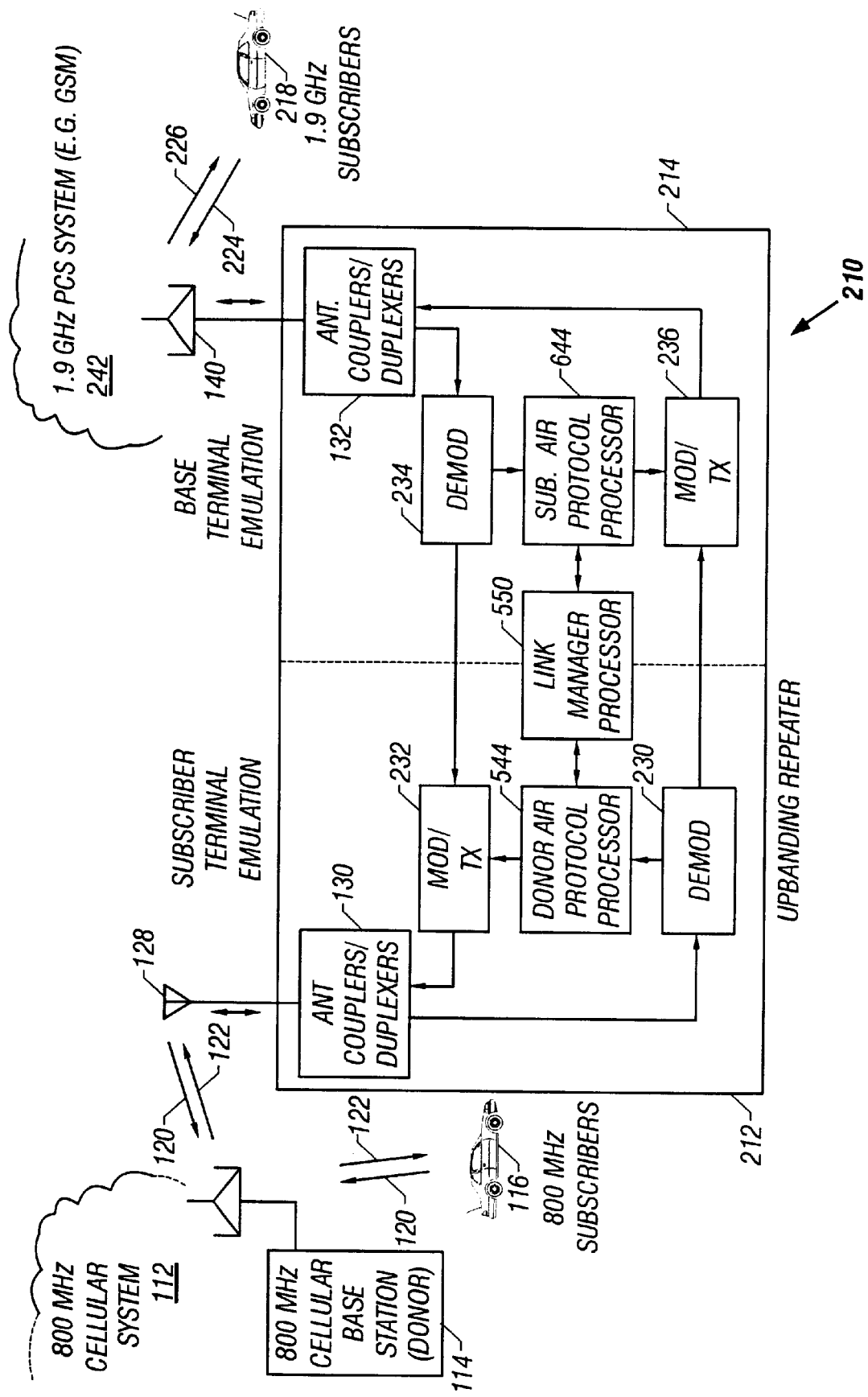
FIG. 2 is a simplified block diagram showing a repeater constructed according to a second embodiment of the present invention as it might be applied to allow communications terminals of a first communications system with terminals of a second, dissimilar communications system, in which the first and second communications systems are selected for exemplary purposes to be a conventional 800 MHz TDMA cellular system and a 1.9 GHz GSM PCS system.
Figure 6:
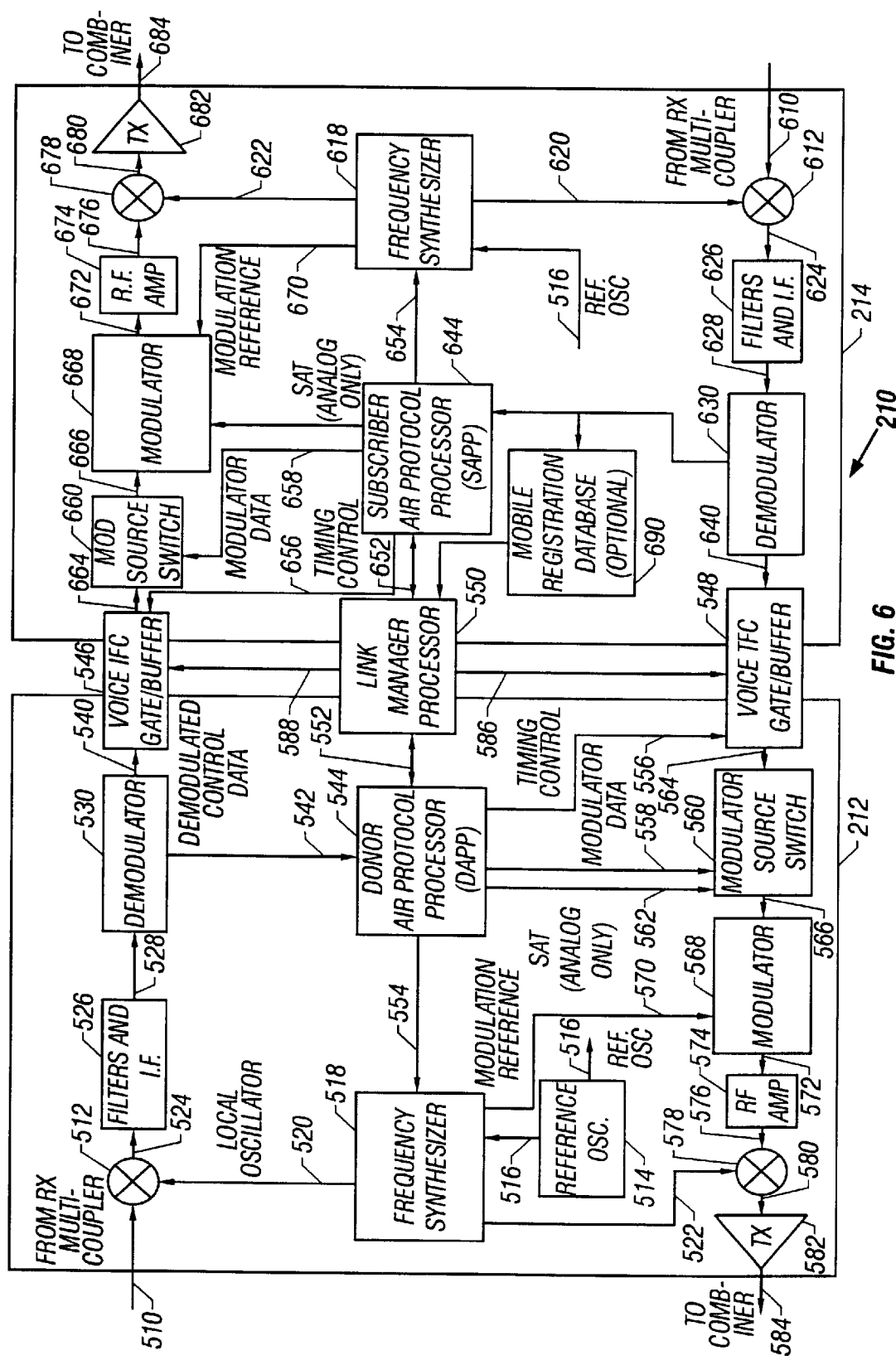
FIG. 6 is a block diagram showing the construction of a repeater according to the second embodiment, as depicted in FIG. 2.

FIGS. 2 and 6–11 show a second preferred embodiment of a repeater constructed according to an aspect of the present invention, for use in applications in which the first and second communications systems may operate in different frequency bands, and may employ either different or identical air protocols. As best seen in FIGS. 2 and 6, a second preferred embodiment of the invention comprises a protocol-converting repeater 210 adapted for bidirectional communications with terminals of first and second communications systems 112 and 242 respectively. The repeater 210 functions to permit terminals of one communications system to communicate with terminals of the other communications system, where such terminals would not otherwise be able to communicate because the respective terminals operate on different frequencies, and/or employ different air protocols or radio interfaces.

The inventive repeater 210 is referred to as a "protocol-converting repeater" because it has the capability of converting communications adhering to a first air protocol or radio interface to communications adhering to a second air protocol or radio interface. Thus, the protocol-converting repeater 210 eliminates the requirement of the previously described frequency-translating repeater 110 that the air protocols of the two communication systems be identical or compatible. However, it should be noted that the protocol-converting repeater 210 does not require that the protocols of the two systems be incompatible; it may be advantageously employed in applications in which the air protocols are identical. In addition, although the exemplary application to be discussed contemplates that each of the communications systems 112 and 242 may operate in substantially different frequency ranges, the protocol-converting repeater 210 could also be used in applications in which the operating frequencies of the two systems are close to or interspersed with one another (as conventional cellular repeaters now function).

In an exemplary application, the first communications system 112 may be a TDMA cellular system operating in the 800 MHz band, and the second communications system 242 may be a GSM PCS system operating in the 1.9 GHz band. In this application, the protocol-converting repeater 210 is preferably constructed to permit subscriber terminals 218 of the 1.9 GHz GSM PCS system 242 to communicate with one or more base station terminals 114 of the 800 MHz TDMA cellular system 112. The substantial differences between the GSM and TDMA air protocols may aid the reader in appreciating the need for protocol conversion in order to permit subscriber terminals equipped to use a first air protocol to communicate with base stations equipped to use a second air protocol. Accordingly, that particular combination of frequencies and air protocols is used as an exemplary application environment in connection with which the second embodiment is described. However, a protocol converting repeater 210 could be used in applications involving other combinations of air protocols and frequencies. By way of one further example, the first communications system could be an "analog" cellular system operating in the 800 MHz band, and the second communications system could be a TDMA PCS system operating in the 1.9 GHz band. Moreover, the protocol-converting repeater 210 may also be used in conjunction with communications systems which do not distinguish between subscriber and base terminals.

Moreover, the term "system" as used herein refers to one or more terminals adapted for communications according to a predetermined air protocol or radio interface, but is not intended to imply that the infrastructure normally used to implement such systems is necessarily present. In particular, although reference is made to a 1.9 GHz GSM PCS "system" 242, no 1.9 GHz GSM PCS base stations need be present, and it is the function of the inventive protocol-converting repeater 210 to service 1.9 GHz GSM PCS mobiles 218 in locations where such base stations are not available.

The protocol-converting repeater 210 is located in an area in which it is desired to provide services to 1.9 GHz GSM PCS mobiles 218, and in which the repeater 210 may communicate with an 800 MHz TDMA cellular base station 114. The cellular base station 114 is sometimes referred to as the "donor" because it donates some of its capacity to serve 1.9 GHz GSM PCS mobiles 218 through the repeater 210. The 800 MHz TDMA cellular base station 114 transmits on one or more forward (base-station-to-mobile) channels 122 and receives on one or more reverse (mobile-to-base-station) channels 120 allocated in the 800 MHz cellular band. 800 MHz mobiles 116 receive on the forward channels 122 and transmit on the reverse channels 120. The protocol-converting repeater 210 also receives on the forward channel 122 and transmits on the reverse channel 120, so that from the perspective of the 800 MHz TDMA cellular base station 114, the repeater 210 appears as an 800 MHz TDMA mobile.

The GSM air protocol employs a comparatively wide-bandwidth RF channel capable of supporting a larger number of conversations than the RF channel used in the standardized TDMA systems of the United States. In order to communicate with 1.9 GHz GSM PCS mobiles, the repeater 210 transmits on a forward (base-station-to-mobile) channel 226 and receives on a reverse (mobile-to-base-station) channel 224 allocated in the 1.9 GHz PCS band. Mobiles 218 operating in the 1.9 GHz GSM PCS system 242 in the coverage area of the repeater 210 receive on the forward channel 226 and transmit on the reverse channel 224. Thus, from the perspective of 1.9 GHz GSM PCS mobiles 218, the repeater 210 appears as a 1.9 GHz GSM PCS base station.

The protocol-converting repeater 210 has several fundamental differences from the frequency-translating repeater 110 described previously. The frequency translating repeater 110 operates under a number of particular constraints which allow it to pass both message traffic (e.g., encoded voice conversation signals) and signaling and control traffic substantially transparently from the perspective of terminals in each communications system. Thus, the frequency-translating repeater 110 generally need not demodulate and remodulate most message/voice traffic, and it need not attempt to interpret or modify most control and signalling traffic. In contrast, the protocol-converting repeater 210 emulates the behavior of an appropriate terminal in each of the communications systems in which it operates. In order accomplish this, the protocol-converting repeater 210 demodulates and remodulates message/voice traffic, and interprets and retransmits (with any required modifications or conversions) control and/or signaling traffic, which are to be exchanged between the two communications systems 112, 242.

As best seen in FIG. 2 (which is a block diagram of the repeater 210, shown in simplified form to enhance clarity), the protocol-converting repeater 210 comprises means 212 for emulating a subscriber terminal (i.e., a mobile) and for communicating with a base-station terminal in the first communications system 112 (i.e., an 800 MHz TDMA cellular system), means 214 for emulating a base-station terminal and for communicating with subscriber terminals (i.e., mobiles) in the second communications system 242 (i.e., a 1.9 GHz GSM PCS system 242), and means (including link manager processor 550 and other components) for converting and transferring both message/voice traffic and control and signalling traffic between the respective terminal emulation means 212, 214.

The subscriber terminal emulation means 212 comprises, inter alia: an 800 MHz antenna coupling means 130 connected to an 800 MHz-band antenna 128; means 230 for receiving and demodulating signals from the donor 800 MHz TDMA cellular base station 114; means 232 for modulating and transmitting signals to the donor 800 MHz TDMA cellular base station 114; and Donor Air Protocol Processor (DAPP) means 544 for implementing the TDMA air protocol of the 800 MHz TDMA cellular system 112. The base terminal emulation means 214 comprises, inter alia: a 1.9 GHz antenna coupling means 132 connected to a 1.9 GHz-band antenna 140; means 234 for receiving and demodulating signals from the 1.9 GHz GSM PCS subscriber terminals 218; means 236 for modulating and transmitting signals to the 1.9 GHz GSM PCS subscriber terminals 218; and Subscriber Air Protocol Processor (SAPP) means 644 for implementing the GSM air protocol of the 1.9 GHz GSM PCS system 242.

Control/signalling information transmitted by the 800 MHz TDMA cellular base station 114 is received by the donor-side receiver/demodulator 230 and supplied to the DAPP 544. The DAPP 544 emulates an 800 MHz TDMA cellular mobile, and may supply to the donor-side modulator/transmitter 232 responsive control information to be transmitted to the 800 MHz TDMA cellular base station 114, as required by the TDMA air protocol. DAPP 544 also supplies the received control/signalling information to the link manager processor 550. The link manager processor (LMP) 550 supervises connections between 1.9 GHz GSM PCS subscriber terminals 218 and the 800 MHz TDMA cellular base station 114 by supervising the exchange of both message/voice traffic and control/signalling traffic between the subscriber terminal emulation means 212 and the base terminal emulation means 214. The link manager processor 550 converts, as necessary, the control/signalling information into a form or meaning suitable for use in the air protocol of the 1.9 GHz GSM PCS system 242, and supplies the control/signalling information to SAPP 644. The SAPP 644, implementing the air protocol of the 1.9 GHz GSM PCS system 242, sends appropriate control/signalling information to the 1.9 GHz GSM PCS mobile to achieve the effect of the control/signalling information originally sent by the 800 MHz TDMA cellular base station 114.

Control/signalling information transmitted by the 1.9 GHz GSM PCS subscriber terminals 218 is received by the subscriber-side receiver/demodulator 234, and is processed in an analogous manner. The control/signalling information is supplied to the SAPP 644. The SAPP 644 emulates a 1.9 GHz GSM PCS base station, and may supply to the subscriber-side modulator/transmitter 236 responsive control information to be transmitted to the 1.9 GHz GSM PCS subscriber terminals 218, as required by the GSM air protocol. SAPP 644 also supplies the received control/signalling information to the link manager processor 550. The link manager processor 550 converts, as necessary, the control/signalling information into a form or meaning suitable for use in the air protocol of the 800 MHz TDMA cellular system 112, and supplies the control/signalling information to DAPP 544. The DAPP 544, implementing the air protocol of the 800 MHz TDMA cellular system 112, sends appropriate control/signalling information to the 800 MHz TDMA cellular base station 114 to achieve the effect of the control/signalling information originally sent by the 1.9 GHz GSM PCS subscriber terminal 218.

The link manager processor 550 monitors the control/signalling information to determine when a connection for message/voice traffic is required between the systems (e.g., the mobile originates or receives a call) or an existing connection must be terminated. When a connection is required, the link manager processor 550 enables signal paths for message/voice traffic from subscriber-side receiver/demodulator 234 to the donor-side modulator/transmitter 232, and from donor-side receiver/demodulator 230 to the subscriber-side modulator/transmitter 236. Because the formats for encoding voice signal information employed by the TDMA and GSM air protocols are different, each of the receiver/demodulators 230 and 234 must convert the received voice signal information into a common format for use by the respective modulator/transmitter 236, 232. The modulator/transmitters 236 and 232 convert the voice signal information into the formats required by the GSM and TDMA air protocols, respectively, and transmit that information to the 1.9 GHz GSM mobile 218 and 800 MHz TDMA base station 114, respectively. The common format may be "baseband" audio, but may also be any other suitable format with which the modulators and demodulators are compatible. If the connection must be terminated, the link manager processor 550 inhibits the signal paths.

Because the protocol-converting repeater 210 emulates an appropriate terminal in each communications system, and because it demodulates and remodulates both control/signalling and message/voice traffic, the repeater 210 provides several important advantages over other repeaters which do not perform these functions. Repeater 210 allows terminals of one communications system to communicate with terminals of a second communication system which uses a substantially different air protocol or radio interface. In addition, repeater 210 eliminates the requirement of maintaining timing between the base station and mobiles when used in conjunction with an air protocols in which round-trip signal timing is severely constrained (such as TDMA). Further, the inventive repeater 210 allows message modification for specific functions for system emulation. For example, the repeater 210 may map channel assignments made by the 800 MHz cellular system to a channel assignment number that conforms to the PCS cellular band. Moreover, because the repeater 210 effectively locally generates (or regenerates) everything it transmits, there is no ambiguity as to whether the reverse (repeater-to-donor) path should be enabled. Thus, the repeater 210 eliminates the need for complex algorithms for gating the repeater-to-donor signal path.

FIG. 6 is a block diagram showing in greater detail the construction of an embodiment of a protocol-converting repeater 210. The repeater 210 may be conceptually divided into means 212 for emulating an 800 MHz TDMA cellular subscriber terminal, means 214 for emulating a 1.9 GHz GSM PCS subscriber terminal, and certain additional facilities common to both emulation means 212 and 214 for supervising and interconnecting the emulation means and for providing a frequency reference.

The common facilities will be discussed first. The link manager processor 550 supervises the operation of the subscriber terminal emulation means 212 and base terminal emulation means 214 and provides a communications path for control information between these components. As a result, the link manager processor 550 also provides the communications path for control/signalling information between the 800 MHz TDMA cellular base station 114 and the 1.9 GHz GSM PCS subscriber terminals 218. The link manager processor 550 may be implemented using any suitable means for implementing control and processing functions, such as "hard-wired" digital logic, a general purpose microprocessor with appropriate support hardware, or digital signal processors.

A forward voice traffic gate/buffer means 546 provides a communications path between the subscriber terminal emulation means 212 and the base terminal emulation means 214 for voice signals (or other user message traffic) in the forward (base-station-to-mobile) direction. A reverse voice traffic gate/buffer means 548 provides a communications path between the base terminal emulation means 214 and the subscriber terminal emulation means 212 for voice signals (or other user message traffic) in the reverse (mobile-to-base-station) direction. The voice traffic gate/buffer means 546 and 548 receive demodulated voice signal information (or other user message traffic) in a compatible format from emulation means 212, 214, respectively and forward that information to the opposing emulation means 214, 212, to be transmitted to the 1.9 GHz mobile 218 or the 800 MHz base station 114. The link manager processor 550 controls the operation of voice traffic gate/buffer means 546 and 548 by means of control signals on signal paths 586 and 588 respectively.

The functions of buffers 546 and 548 depend on the air protocols of the systems between which the voice signal information is being exchanged. For example, if the repeater is used in an application in which both systems employ an "analog" voice air protocol (see FIG. 11*a*), the buffers may be implemented simply as audio amplifiers with 300–3000 Hz band-pass filtering for subsequent remodulation.

Figure 11A:
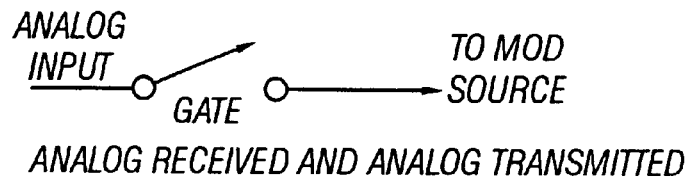
FIG. 11a is a block diagram showing the organization of a voice traffic gate/buffer means for use when with the repeater of FIG. 6 when the protocols being received and transmitted are both analog protocols.
Figure 11B:
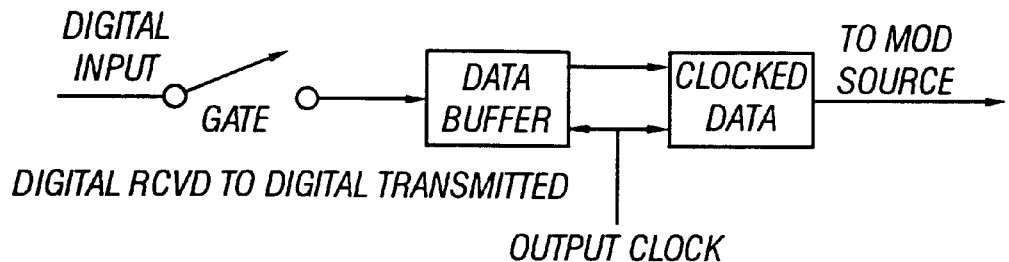
FIG. 11b is a block diagram showing the organization of a voice traffic gate/buffer means for use when with the repeater of FIG. 6 when the protocols being received and transmitted are both digital protocols.
Figure 11C:
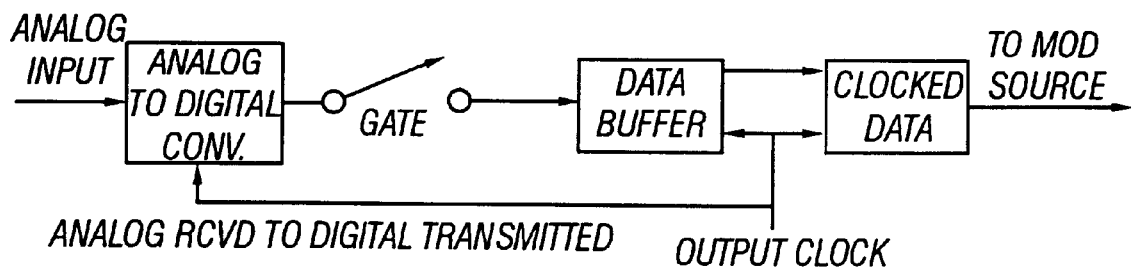
FIG. 11c is a block diagram showing the organization of a voice traffic gate/buffer means for use when with the repeater of FIG. 6 when the protocol being received is an analog protocol and the protocol being transmitted is a digital protocol.
Figure 11D:
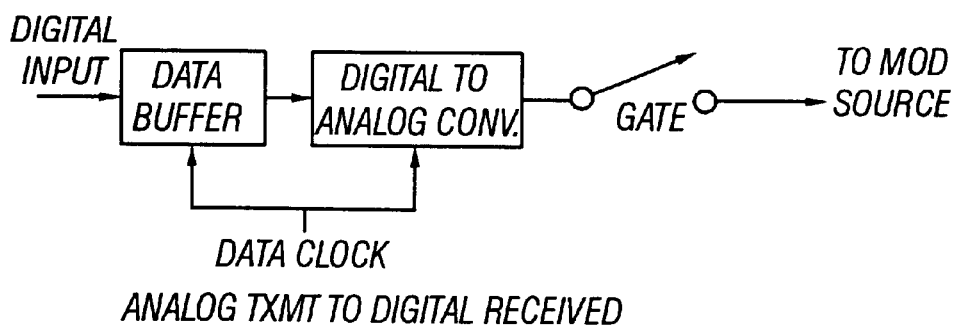
FIG. 11d is a block diagram showing the organization of a voice traffic gate/buffer means for use when with the repeater of FIG. 6 when the protocol being received is a digital protocol and the protocol being transmitted is an analog protocol.

If one air protocol is an "analog" voice air protocol, and the other is a digital protocol, then buffers 546 and 548 will perform vocoding (voice encoding) and timing/framing functions (see FIGS. 11*c* and 11*d*). Timing and framing will be under control of the air protocol processor responsible for transmitting the voice signals or data. Thus, the forward voice traffic gate/buffer means 546 would receive timing control information on signal path 656 from SAPP 644, and the reverse voice traffic gate/buffer means 548 would receive timing control information on signal path 556 from DAPP 544. Such timing control information, would, for example, enable the voice traffic gate/buffer means 548 to format the data to match the time slot timing of a TDMA signal.

If both air protocols are digital protocols (i.e., employ digital encoding of voice traffic, as in the exemplary application discussed here), then the buffers 546, 548 buffer, retime, reformat (if the air protocols are non-identical) and reframe the voice data. See FIG. 11*b*. Timing control information on signal path 556 would be provided such that the air protocol in use (such as TDMA, CDMA, DECT, etc.) would be adhered to. The buffers 546, 548 provide temporary storage of the encoded voice data to accommodate variations in the rate at which data is obtained from the receiver, demodulator, or decoder, and the rate at which the data may be required by the transmitting encoder or modulator. Again, the timing and framing is under the control of the air protocol processor responsive controlled by the air protocol processor responsible for transmitting the voice signals or data. If both protocols are digital, then it is not necessary to decode the voice signals to analog form for re-encoding into the target coding format. Instead, the coding format may be converted using known coding conversion algorithms.

The repeater 210 preferably includes a suitable reference oscillator 514 for generating a frequency reference signal for use in frequency synthesis. A single reference oscillator 514 may be used to serve all local oscillators in the repeater 210. Government regulations and operational characteristics of cellular and PCS air protocols impose severe constraints on operating frequencies and timing signals derived from the reference signal. Accordingly, the reference oscillator 514 is preferably a high-stability ovenized or temperature-compensated oscillator. For some air protocols (particularly GSM, TDMA, and CDMA) the reference oscillator must be phase-locked with a signal from the donor base station. The design of such oscillators is well known in the art, and suitable oscillators are commercially available. The output of the reference oscillator 514 is distributed to frequency synthesizers 518 and 618 via signal path 516. Although the reference oscillator is depicted as part of the subscriber terminal emulation means 212, it is actually part of the common equipment of the repeater.

With small exceptions, the subscriber terminal emulation means 212 and the base terminal emulation means 214 are similarly organized. The subscriber terminal emulation means 212 will be discussed first.

As discussed previously, signals from the donor 800 MHz TDMA cellular base station 114 are received and demodulated by a donor-side receiver/demodulator means. The donor-side receiver/demodulator is shown in FIG. 2 as a block 230; in FIG. 6, the several subcomponents providing the functions of donor-side receiver/demodulator 230 are shown individually. Signals received from 800 MHz TDMA cellular base station 114 at 800 MHz-band antenna 128 are carried via a suitable transmission line to 800 MHz-band antenna coupling means 130 (see FIG. 2). The signal from the antenna coupling means 130 is provided on signal path 510 to a receive mixer 512. A frequency synthesizer 518 provides a local oscillator signal on signal path 520 to the receive mixer 512. The frequency of the local oscillator signal is selected such that when mixed with signals at the selected operating frequency, the mixer output is at a predetermined intermediate frequency (IF), such as 70 MHz, for further processing. Although the IF of the repeater 210 may be chosen from a wide range, frequencies in the range 0–400 MHz are believed to be most suitable because signal processing components for such frequencies can be economically manufactured or obtained from commercial suppliers. Either high-side or low side injection may be used.

The frequency synthesizer 518 produces a second local oscillator output signal on signal path 522 to transmit mixer 578. The receive and transmit local oscillator frequencies need not be identical (and generally are not). The frequency synthesizer may also produce a modulation reference signal which is supplied to modulator 568 via signal path 570. The modulation reference signal is required when certain digital protocols, particularly those employing phase modulation, such as TDMA, are transmitted. The frequency synthesizer 518 is controlled by the DAPP 544 via signal path 554, thereby allowing the DAPP 544 complete control over the transmitting and receiving frequencies of the subscriber terminal emulation means 212.

The output of mixer 512 is provided on signal path 524 to a filter and intermediate-frequency amplifier block 526. Block 526 provides suitable band-pass filtering to reject signals other than those on the desired channel (or group of channels). Block 526 also amplifies the IF signal and provides automatic gain control (AGC) to normalize the IF signal level for further processing. Filter and IF amplifier block 526 may be implemented as shown in FIG. 5 (discussed previously in connection with the frequency-translating repeater 110). The amplified, gain-controlled IF signal output of block 526 is provided via signal path 528 to a demodulator 530.

The demodulator 530 converts the received signal, now carried at the IF, to a "base band" representation. The demodulator may take different forms depending on the air protocol of the system from which the signal is received.

If the originating air protocol is an "analog" voice protocol, such as an analog cellular protocol, the demodulator 530 may be constructed as an FM discriminator with several outputs. A first output would be subject to a voice-band low-pass filter, and would supply normal voice-band audio. A second output would be subject to a 15 KHz low-pass filter, and would supply 10 kb/sec data and 6 KHz supervisory audio tone signals which are carried over the voice channels and which are needed for ordinary call processing. For the NAMPS analog format, a sub-audible output from the demodulator would also be provided to the air protocol processors for processing the low-data-rate digital and supervisory information employed by that format.

If the originating air protocol is the U.S. standard TDMA format, the required demodulator is constructed as a pi/4 shifted differentially-encoded 4-Phase-shift keying (pi/4 DQPSK) demodulator. Such demodulators are commercially available. The demodulator output appears as a serial digital data stream which is routed via signal path 540 to the forward voice traffic gate/buffer means 546 for digital buffering and timing control. SACCH and FACCH (slow-associated control channel) and (fast-associated control channel) information recovered from the demodulator 130 is routed via signal path 542 to DAPP 544.

If the originating air protocol is GSM, the demodulator 130 is essentially an FM discriminator that demodulates the GSM GMSK (Gaussian Minimum-shift-keying) RF signal. Although the format of the demodulated GSM signal has some similarities to the format of a demodulated TDMA signal, the data rate of the demodulated GSM signal is higher. The GSM signal carries SACCH and FACCH information which is also routed to the DAPP 544 via signal path 542.

If the originating air protocol is CDMA, the demodulator 130 contains the decorrelators for the specific channels that are being decoded. For this case, more that one conversation may be handled through the IF path. In this case, the decorrelator and key will be employed for each conversation. Encoded voice signals are routed to the forward voice traffic gate/buffer means 546 via signal path 540. Control/signalling information recovered by the demodulator 130 is routed via signal path 542 to DAPP 544.

Other modulation formats and air protocols such as NMT, and DECT, may also be used.

The DAPP 544 is responsible for emulating an 800 MHz TDMA cellular subscriber terminal by implementing the air protocol of the donor 800 MHz TDMA cellular base station 114. DAPP 544 receives demodulated control data on signal path 542 from demodulator 530, exchanges call processing and other control information with the link manager processor 550 via signal path 552, provides timing/framing control information to reverse voice traffic gate/buffer means 548 via signal path 556, and provides control data (essentially, control/signalling information intended to be transmitted to the 800 MHz TDMA cellular base station 114) to modulator source switch 560 via signal path 558. The DAPP 544 provides control signals to frequency synthesizer 518 via signal path 554. This allows the DAPP 544 to control the frequencies (channels) on which the subscriber terminal emulation means 212 transmits and receives. In addition, if the DAPP 544 is emulating an analog air protocol, the DAPP 544 also provides a supervisory audio tone (SAT) signal to the modulator source switch 560 via signal path 562.

The specific control and call processing functions required to be performed by the DAPP 544 in order to implement a particular air protocol are defined by industry standard-setting organizations such as EIA/TIA, or government agencies as published standards, such as the "IS-136" standard for TDMA systems, the "IS-95" standard for CDMA systems in the 800 MHz band, and the "EIA-553A" standard for analog cellular systems. Generally, the air protocol processors for any given protocol may be available as specialized application-specific integrated circuits, and generally include on-board microcomputers and digital signal processing capability.

As discussed previously, signals to be sent to the donor 800 MHz TDMA cellular base station 114 are modulated and transmitted by a donor-side modulator/transmitter means. The donor-side modulator/transmitter is shown in FIG. 2 as a block 232; in FIG. 6, the several subcomponents forming the functions of the donor-side modulator/transmitter 232 are shown individually.

Signals to be transmitted to the donor 114 may be control/signalling information generated by the DAPP 544 in order to implement the TDMA air protocol, or may be voice traffic (or other user message traffic) originating from a 1.9 GHz GSM PCS mobile 218 and received by the base terminal emulation means 214. A modulator source switch 560 receives several modulation signal inputs, and selects one or more to pass to the modulator for transmission to the donor 114. The modulator source switch 560 receives voice signals (or signals representing other user message traffic) from the reverse voice traffic gate/buffer means 548 on signal path 564. When, as in the exemplary application, the voice signals are received from a system using a digital air protocol, these signals are preferably buffered to accommodate differences between the rate at which data is supplied by the demodulator and the rate at which data is consumed by the modulator. The data is delayed in time with respect to the input to the buffer 548. The data may have control data words inserted in place of the original control data by the DAPP 544. Voice traffic data is delayed by the same amount but it will not be modified. In this way, consistent timing of both control data and voice traffic data will be maintained. The modulator source switch 560 also receives control/signalling data from DAPP 544 via signal path 558. Under control of the DAPP 544, the modulation source switch 560 selects the appropriate modulation source signal (e.g., either voice signals or control data) and passes such signals to the modulator 568 via signal path 566. In other applications, such as when the subscriber terminal emulation means 212 is required to emulate an analog cellular air protocol, the modulator source switch 560 may receive additional signals, such as supervisory audio tone SAT signals, which may be included for modulation and transmission to the donor 114.

The modulator 568 receives the selected modulation source signal from switch 560, and a modulation frequency reference signal from frequency synthesizer 518 via signal path 570. The modulator applies the appropriate modulation method in compliance with the emulated air protocol, and produces a modulated carrier at a selected transmitter intermediate frequency (IF) on signal path 572. Any appropriate IF may be selected, such as 70 MHz. The modulation method or type implemented by the modulator 568 may, but need not be, the same as that implemented by demodulator 530. Modulation types may be analog (as employed in the AMPS and NAMPS cellular air protocols), or digital (as employed in the TDMA, GSM, CDMA, NMT, and DECT air protocols). The design of modulators for each of the standard air protocols is well known in the art.

The modulated IF signal on signal path 572 is provided to an RF amplifier 574, which amplifies and buffers the IF signal for mixing. The amplified IF signal is supplied to mixer 578 via signal path 576. Mixer 578 also receives a local oscillator signal on signal path 522 from the frequency synthesizer 518. Since the IF is typically below the transmitter's operating frequency, the mixer operates as an "up-converter," converting the IF frequency upward to the transmitter operating frequency. However, an IF above the transmitter operating frequency could also be used. The mixer output is preferably filtered using known techniques to eliminate spurious mixing products which must not be transmitted. The mixer output at the selected transmitter operating frequency is provided via signal path 580 to an RF transmit power amplifier 582. The power amplifier 582 amplifies the mixer output to a level necessary to provide communications over the distance between the protocol-converting repeater 210 and the 800 MHz TDMA cellular base station 114. In some cases, the repeater will be required to operate simultaneously on multiple channels.

It may be desirable to combine the outputs of several subscriber terminal emulation means 212, using known techniques for preventing generation of intermodulation products and other interference, for transmission by a single antenna. The combined outputs may be amplified by a linear amplifier (such as a class-A amplifier or a feed-forward amplifier), and supplied to the antenna, or may be supplied directly to the antenna without further amplification. In addition, it may be desirable to use a single antenna for both transmitting and receiving. The output signal from the transmit power amplifier 582 is supplied via a transmission line or other signal path 582 to 800 MHz-band antenna coupling means 130, which may include suitable combiners, multicouplers, and duplexers, to perform these functions.

Because the organization of the base terminal emulation means 214 is nearly a mirror image of the organization of the subscriber terminal emulation means 212, the base terminal emulation means 214 will not be discussed in detail except to say that the base terminal emulation means 214 differs from the subscriber terminal emulation means 212 in the following ways:

(1) the base terminal emulation means 214 communicates with 1.9 GHz GSM PCS subscriber terminals 218;

(2) the base terminal emulation means 214 emulates a 1.9 GHz GSM PCS base station by means of a Subscriber Air Protocol Processor (SAPP) 644, which functions in a manner similar to the DAPP 544 but implements the GSM air protocol;

(3) signal flow is essentially reversed; and (4) because the emulation means 214 is performing the functions of a base station, a mobile registration database 690 may optionally be provided to allow the repeater to monitor which mobiles are present in the repeater coverage area and can be serviced by the repeater.

The registration database 690 allows the repeater to minimize traffic on control channels by transmitting pages (or other control signals) destined only for mobiles that can be serviced by the repeater. Because the repeater 210 receives paging traffic from the 800 MHz TDMA cellular base station 114, a substantial fraction of the paging traffic typically would be destined for 800 MHz mobiles 116, and often the traffic may be destined for mobiles outside the coverage area of either the repeater 210 or the cellular base station 114. Many cellular and PCS air protocols have provisions for automatic registration by a mobile when it enters a cell coverage area and at regular intervals thereafter. The mobile registration database 690 preferably receives such mobile registration messages from demodulator 630 via a signal path 642, and maintains a list of registered mobiles which are believed to be in the coverage area of the repeater and eligible for service thereby. The mobile registration database 690 communicates with the link manager processor 550 via signal path 692. The link manager processor 550 may consult the database to determine which pages received from the 800 MHz TDMA cellular base station 114 should be forwarded to 1.9 GHz GSM PCS mobiles 218. In addition, the link manager processor 550 can update the mobile registration database from time to time.

Figure 9:
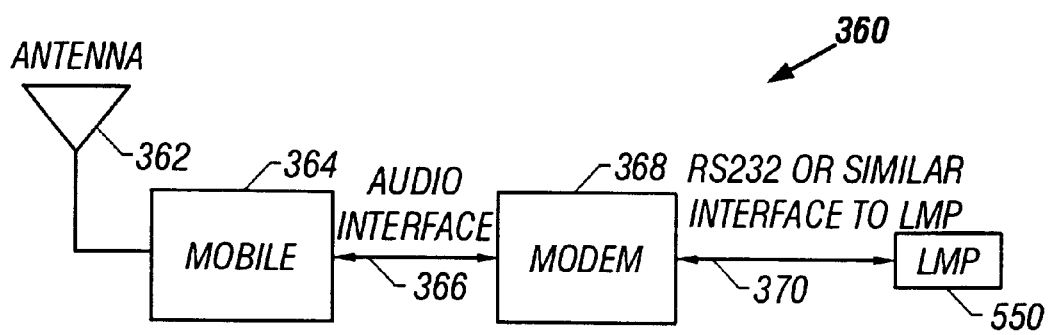
FIG. 9 is a block diagram of a dial-up interface for use with the repeater of FIGS. 3 and 6 for control and remote data collection.

FIG. 9 is a block diagram of a dial-up interface 360 for use with the repeater 210 of FIG. 6 for control and remote data collection. The interface 360 allows a remote user to send information to, or receive information from, the link manager processor (LMP) 550 and other control components of the repeater 210, using a data link carried over a standard telephone line, or a cellular, PCS or other wireless circuit or service. Remote access via a wireless service is advantageous because repeaters are often installed in locations where physical access is difficult or time-consuming, and a wire-line connection (such as a conventional telephone line) is unavailable or undesirable. The interface 360 comprises an antenna 362, a cellular, PCS or other subscriber terminal 364 connected to the antenna 362, and a modem 368 connected to the subscriber terminal via any suitable audio interface or signal path 366. The modem 368 may be any suitable modem which is tolerant of the impairments that typically occur over wireless circuits. The modem 368 may be connected to the LMP 550 or other control components of the repeater via a data path 370, which may be implemented, for example, as an RS-232 interface. To use the remote interface 360, the user employs a conventional computer or terminal with a suitable modem (not shown) connected to the public telephone network, and places a call to the mobile 364. The mobile 364 and modem 368 are preferably configured to automatically answer the call, creating a data link between the user's computer or terminal and the LMP 550. The user may employ the link, for example, to inspect or change repeater operating parameters, upload operating software, or download statistics. In some applications, the interface 360 may be configured to initiate a call to a remote computer to report statistics or trouble.

The structure of the protocol-converting repeater 210 having been described, the functions of the link manager processor 550 will now be explained in greater detail. The link manager processor (LMP) 550 performs the following functions:

(1) The LMP recognizes that a page to a 1.9 GHz GSM PCS mobile 218 has been received from the 800 MHz TDMA cellular base station 114 via the DAPP 544;

(2) Upon recognition of the page data from the donor 114, the LMP communicates with the SAPP 644 to cause the page to be retransmitted to 1.9 GHz GSM PCS subscriber terminals 218 in the repeater coverage area. (In other applications the air protocol and frequency band of the forward (repeater-subscriber) path may be the same as, or different from the air protocol and frequency band of the reverse (repeater-donor) path).

(3) If the repeater channel is used for digital voice traffic (referred to, in connection with certain air protocols as a digital traffic channel (DTC)), or for analog voice traffic, the LMP 550 controls the required voice buffering between the output of the receivers 230, 234 (FIG. 2) and the input of the transmitters 232, 236 (FIG. 2). The actual gating and buffering is performed by forward voice traffic gate/buffer means 546 and reverse voice traffic gate/buffer means 548.

(4) If a call origination is detected by the SAPP 644, LMP 550 controls the DAPP such that a call with be originated toward the donor 800 MHz TDMA cellular base station 114 as if the repeater 210 were a mobile. That is, the repeater 210 assumes the role of a subscriber terminal in establishing a call, employing the air protocol that is expected by the donor base station 114.

(5) If the call requires the use of an analog or digital voice channel, the LMP 550 controls the required voice buffering between the output of the receivers 230, 234 (FIG. 2) and the input of the transmitters 232, 236 (FIG. 2). The actual gating and buffering is performed by forward voice traffic gate/buffer means 546 and reverse voice traffic gate/buffer means 548.

Figure 10A:
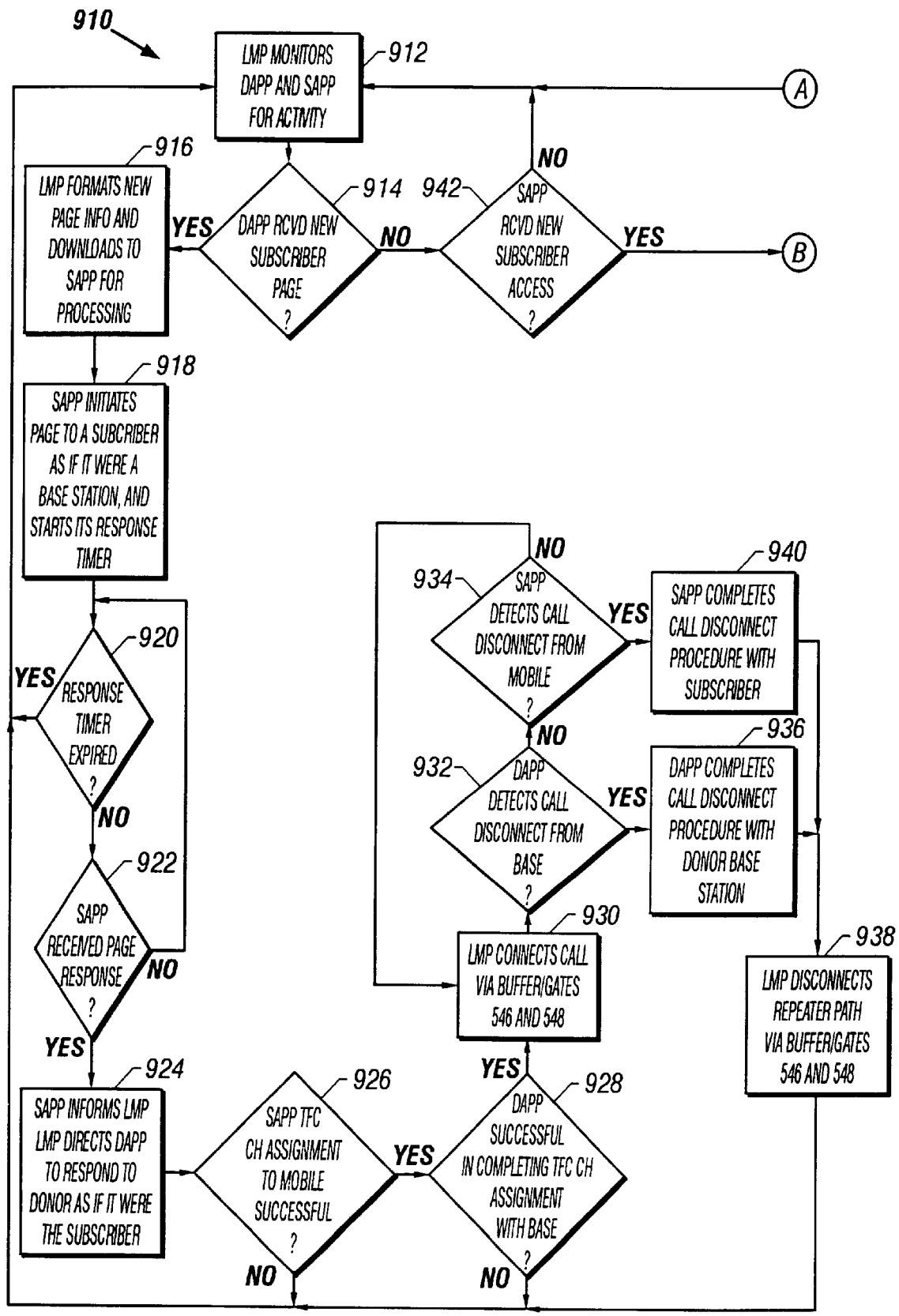
FIGS. 10a and 10b form a block diagram showing a method for controlling a link manager processor component, for use in conjunction with the repeater of FIG. 6.
Figure 10B:
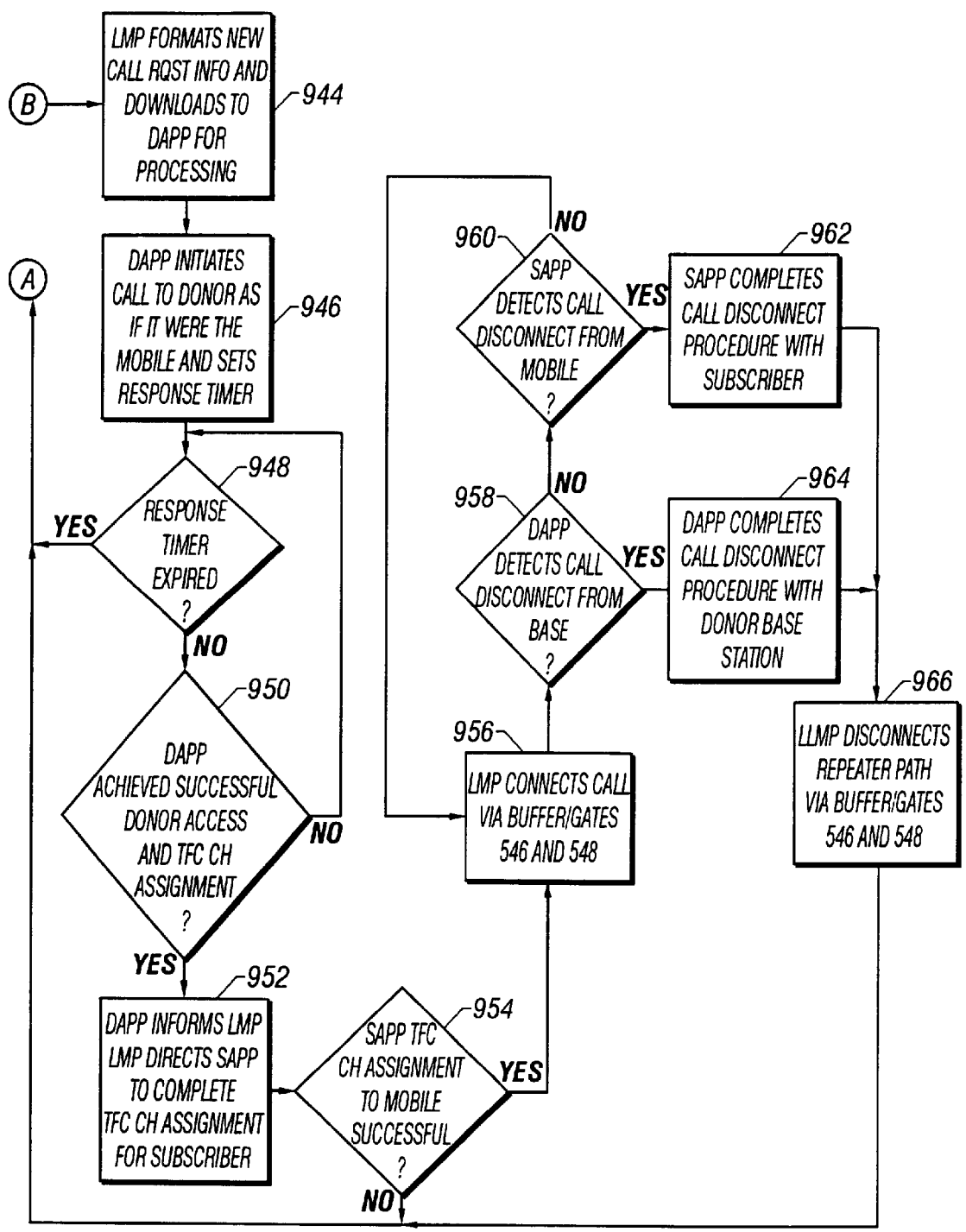

FIGS. 10a and 10b are a block diagram showing a method 910 for controlling the link manager processor 550 in conjunction with the protocol-converting repeater 210.

In step 912, the LMP monitors the DAPP 544 and SAPP 644 for activity. In steps 914 and 942, the LMP determines whether any activity has been observed that requires its attention. In step 914, the LMP determines whether the DAPP 544 has received a new page for a subscriber. If so, the method continues with step 916. If not, the method continues with step 942, in which the LMP determines whether the SAPP 644 has received a new access attempt (or origination) from a subscriber. If so, the method continues with step 944. Otherwise, the method returns to step 912.

If a new subscriber page has arrived, then in step 916, the LMP formats paging information, according to the air protocol of the mobile 218, and downloads the paging information to the SAPP 644 for processing. A conversion of the page information from the donor air protocol to the mobile air protocol may be required. In step 918, the SAPP 644 transmits the page information to the subscriber terminal as if the repeater 210 were a base station. The SAPP 644 starts a response timer to await a response from the mobile.

In step 920, a test is performed to determine whether the response timer has expired. If it has, the method returns to step 912. If the response timer has not expired, then the method continues in step 922. In step 922, a test is performed to determine whether the SAPP 644 has received a page response from the mobile. If not, the method jumps back to step 920 to continue waiting. If the page response has been received, the method continues at step 924. In step 924, the SAPP 644 informs the LMP that the page response was received. The LMP directs the DAPP 544 to respond to the donor base station 114 as if the repeater 210 were a mobile.

In step 926, the SAPP 644 attempts to assign the mobile to a traffic (voice) channel. If the assignment is successful, the method continues in step 928. If the assignment is not successful, the method jumps back to step 912. In step 928, the DAPP 544 attempts to obtain an assignment of a traffic (voice) channel with the donor base station 214. If the assignment is successful, the method continues in step 920. If the assignment is not successful, the method jumps back to step 912.

In step 930, the LMP makes a connection between the base terminal emulation means 214 and the subscriber terminal emulation means 212 via forward voice traffic gate/buffer means 546 and reverse voice traffic gate/buffer means 548, effectively forming a voice traffic connection between the 1.9 GHz GSM PCS mobile 218 to the donor 800 MHz TDMA cellular base station 114.

The repeater maintains the connection until, in one of steps 932 and 934, a call disconnect instruction (or other indication that disconnection should occur or has occurred) is received from either the mobile 218 or the donor base station 114. In step 932, if the DAPP 544 first detects a call disconnect instruction from the base station 114 (or other disconnect indication affecting the repeater-to-base station path), the method continues in step 936, in which the DAPP 544 completes the call disconnect procedure with the donor base station 114. The method then continues in step 938. If, instead, the SAPP 644 first detects a call disconnect instruction from the mobile 218 (or other disconnect indication affecting the repeater-to-mobile path) in step 934, then the method continues in step 940, in which the SAPP 644 completes the call disconnect procedure with the mobile 218. The method then continues in step 938. If the SAPP 644 does not detect a call disconnect instruction (or other disconnect indication) in either step 932 or step 934, the method returns to step 930, and this cycle continues until a call disconnect instruction (or other disconnect indication) is received.

In step 938, the LMP disables the voice traffic connection through forward voice traffic gate/buffer means 546 and reverse voice traffic gate/buffer means 548. The method then jumps to step 912 to await further activity.

If the SAPP 644 has received a new access attempt (or origination) from a mobile, then in step 944, the LMP formats new call request information, according to the air protocol of the donor base station 214, and downloads the new call request information to the DAPP 544 for processing. A conversion of the new call request information from the mobile air protocol to the donor base station air protocol may be required. In step 946, the DAPP 544 transmits the new call request information to the donor 214 as if the repeater 210 were a mobile. The DAPP 544 starts a response timer to await a response from the base station.

In step 948, a test is performed to determine whether the response timer has expired. If the response timer has expired, the method jumps back to step 912 to await further activity. If the response timer has not expired, the method continues in step 950, in which a test is performed to determine whether the DAPP 544 has successfully accessed the donor base station 214, and has received a traffic channel assignment from the donor. If so, the method continues in step 952. If the test fails, the method loops back to step 948. Steps 948 and 950 are executed until either the response timer expires or a successful access of the donor base station 214 is detected.

In step 952, the DAPP 544 informs the LMP that the donor base station has been successfully accessed and an assignment of the call to a traffic channel has been received. The LMP directs the SAPP 644 to respond to the mobile 218 as if the repeater 210 were a base station. This response includes assigning the mobile 218 to one of the repeaters 1.9 GHz traffic channels.

In step 954, the SAPP 644 determines whether the mobile was successfully assigned to the traffic channel. If the assignment was not successful, the method jumps back to step 912 to await further activity. If the assignment was successful, the method continues in step 956.

In step 956, the LMP makes a connection between the base terminal emulation means 214 and the subscriber terminal emulation means 212 via forward voice traffic gate/buffer means 546 and reverse voice traffic gate/buffer means 548, effectively forming a voice traffic connection between the 1.9 GHz GSM PCS mobile 218 to the donor 800 MHz TDMA cellular base station 114.

The repeater maintains the connection until, in one of steps 958 and 960, a call disconnect instruction (or other indication that disconnection should occur or has occurred) is received from either the mobile 218 or the donor base station 114. In step 958, if the DAPP 544 first detects a call disconnect instruction from the base station 114 (or other disconnect indication affecting the repeater-to-base station path), the method continues in step 964, in which the DAPP 544 completes the call disconnect procedure with the donor base station 114. The method then continues in step 966. If, instead, the SAPP 644 first detects a call disconnect instruction from the mobile 218 (or other disconnect indication affecting the repeater-to-mobile path) in step 960, then the method continues in step 962, in which the SAPP 644 completes the call disconnect procedure with the mobile 218. The method then continues in step 966. If the DAPP 544 does not detect a call disconnect instruction (or other disconnect indication) in either step 958 or step 960, the method returns to step 956, and this cycle continues until a call disconnect instruction (or other disconnect indication) is received.

In step 966, the LMP disables the voice traffic connection through forward voice traffic gate/buffer means 546 and reverse voice traffic gate/buffer means 548. The method then jumps to step 912 to await further activity.

Figure 7:
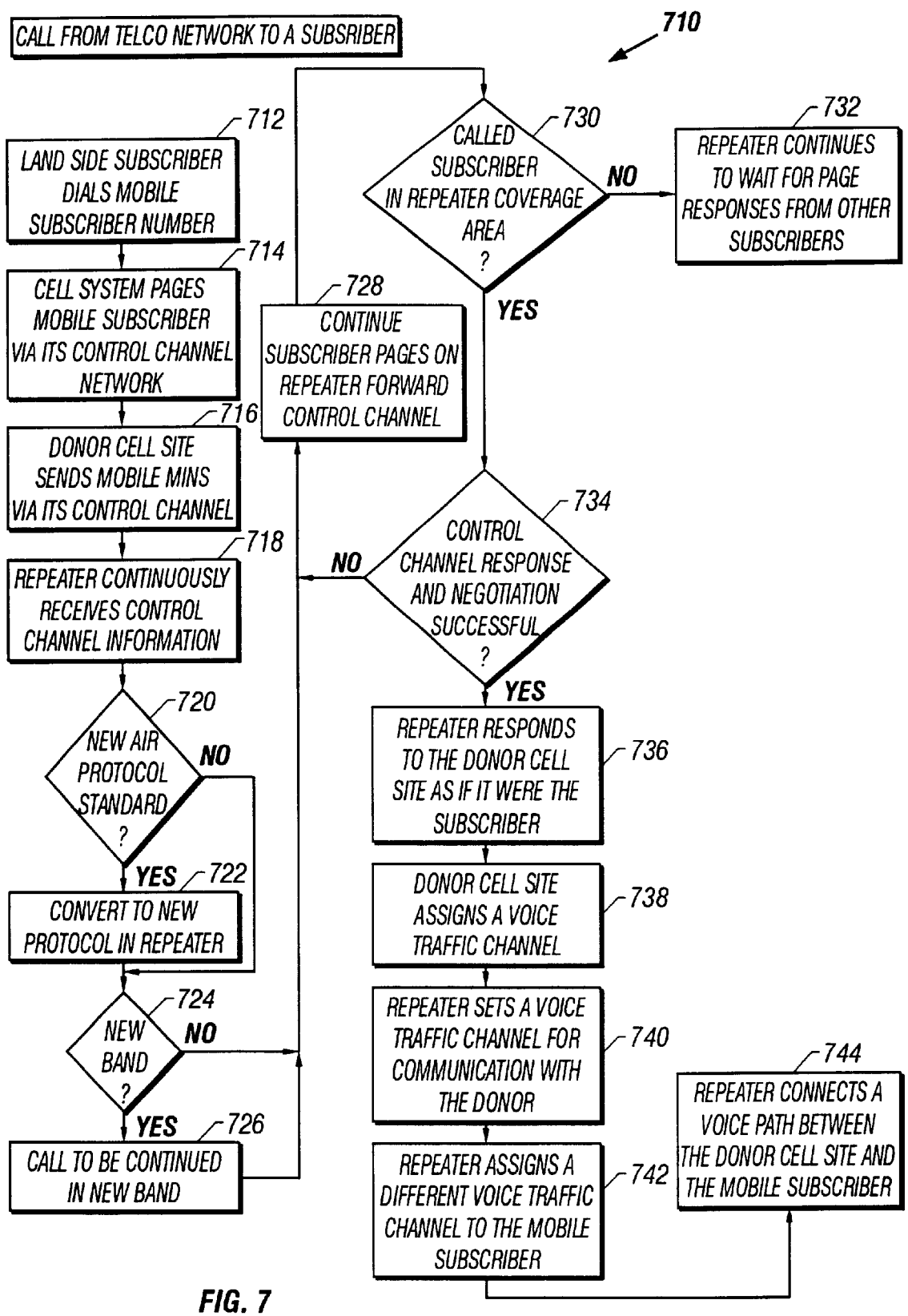
FIG. 7 is a block or flow diagram showing a method for controlling components of the repeater of FIG. 6, in order to process a telephone call in the forward (land-to-mobile) direction.

FIG. 7 is a flow diagram showing a method 710 for use in controlling a protocol-converting repeater (such as repeater 210 of FIGS. 2 and 6) for processing a "incoming" call (i.e., a call originating from the public telephone network and destined for a mobile in the repeater coverage area). The method begins in step 712, in which a land-side subscriber (i.e., a user of the conventional public switched telephone network) dials the telephone number of a subscriber terminal (i.e. mobile) located in the coverage area of the repeater. In step 714, the cellular system pages the mobile subscriber by transmitting appropriate messages over the cellular network forward control channels. In step 716, which is actually a sub-step of step 714, the donor cellular base station (such as the 800 MHz TDMA cellular base station 114 of FIG. 2) transmits page messages, which include the Mobile Identification Numbers (MIs) of mobiles being paged, over its forward control channel.

In step 718, the repeater (such as protocol-converting repeater 210 of FIGS. 2 and 6) continuously receives the forward control channel from the cellular base station. Information transmitted over the forward control channel includes page messages destined for mobile subscribers receiving calls, and certain other control and signaling information.

In steps 720–726, the repeater determines whether a subscriber terminal currently being paged is one which should be serviced through the repeater. The donor cell will typically communicate directly with subscriber terminals operating in the "native" frequency band and air protocol. Thus, the repeater will be involved only when it detects that the donor cellular system has paged a subscriber terminal which can be served by the repeater-i.e., operates on a frequency band or air protocol for which the donor cell cannot directly provide service. Ordinarily, this would be a mobile which has previously registered with the repeater as being in the repeater's coverage area, and would be represented in the repeater's mobile registration database.

In step 720, the repeater determines whether the subscriber terminals which it serves require the repeater to communicate with the subscribers using an air protocol standard different from that which the donor cellular system uses. If not, the method continues in step 724. If the air protocols are different, then in step 722, the repeater converts the paging information to a format required by the subscriber air protocol. The method continues in step 724.

In step 724, the repeater determines whether the subscriber terminals which it serves operate in a frequency band different from that which the donor cellular system uses. If not, the method continues in step 728. If the frequency bands are different, then in step 726, the repeater takes appropriate action to communicate with the subscriber terminal in the correct frequency band. The method continues in step 728.

In step 728, the repeater transmits the subscriber paging information on its forward control channel (using the subscriber air protocol and frequency band). In step 730, the repeater awaits a response from the paged subscriber terminal. If the subscriber terminal is not in the repeater coverage area, or is turned off, the subscriber terminal will not respond to the page. If that occurs, the method continues in step 732, in which the repeater continues to wait for page responses or service requests from other subscriber terminals.

In step 734, the repeater determines whether the subscriber terminal sent a valid response to the page message, and whether subsequent negotiation with the subscriber (relating to subscriber terminal capabilities and other parameters) was successful. If so, the method continues in step 736. If the subscriber terminal response was invalid, or if the subsequent negotiation with the subscriber terminal was unsuccessful, then the method returns to step 728, to try paging the subscriber terminal again.

In step 736, the repeater responds to the donor cellular base station as if it were the subscriber terminal, by sending a properly formatted page response message. In step 738, the donor cellular base station, if it determines that the page response transmitted by the repeater was valid, and that the subsequent negotiation was successful, will assign a voice traffic channel, and advise the repeater.

In step 740, the repeater allocates voice traffic equipment for communicating with the donor cellular base station on the voice traffic channel assigned by the donor. In step 742, the repeater assigns a different voice traffic channel, and allocates corresponding voice traffic equipment, to communicate with the subscriber terminal, and advises the subscriber terminal of the channel assignment via the control channel. In step 744, the repeater connects a voice traffic signal path between the donor cellular base station and the subscriber terminal, enabling the mobile subscriber to carry on a conversation with the land-side subscriber via the repeater. Thereafter, the repeater monitors the call to determine when either the land-side subscriber or the mobile subscriber has ended the call; when the call is ended, the repeater disconnects the voice traffic signal path and releases the voice traffic channels for use in serving other subscribers.

Figure 8:
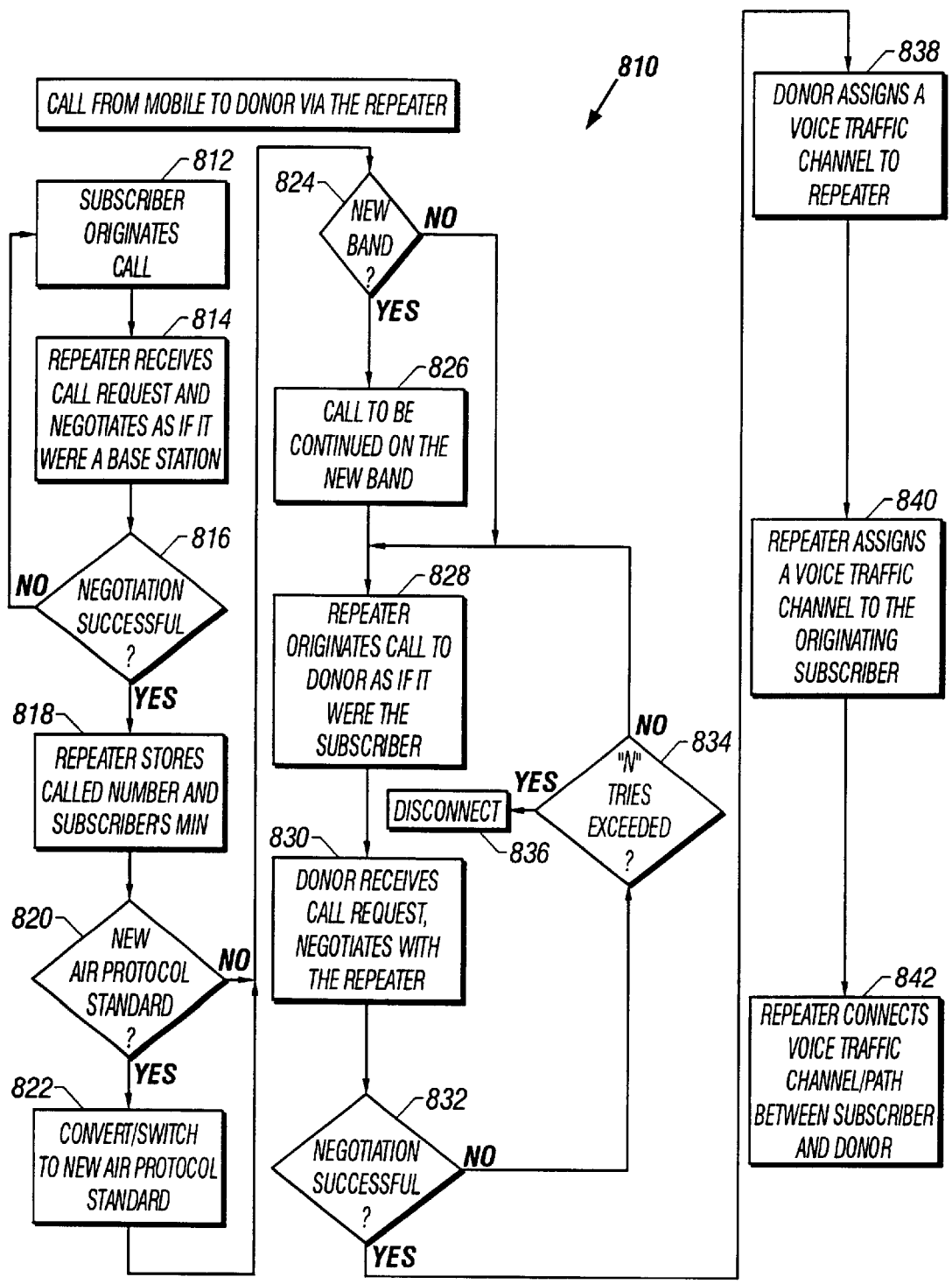
FIG. 8 is a block or flow diagram showing a method for controlling components of the repeater of FIG. 6, in order to process a telephone call in the reverse (mobile-to-land) direction.

FIG. 8 is a flow diagram showing a method 810 for use in controlling the protocol-converting repeater 210 for processing a "outgoing" call (i.e., a call originating from a mobile in the repeater coverage area and destined for the public telephone network). The method begins in step 812, in which a mobile subscriber originates a call by entering the called telephone number into the subscriber terminal (i.e. mobile).

In step 814, the repeater receives the origination request and negotiates with the subscriber terminal as though the repeater were a base station. In step 816, the repeater determines whether the negotiation was successful, and if so, the method continues in step 820. If the negotiation was not successful, the origination attempt fails, and the method returns to step 812 in which the subscriber may attempt the call again. In step 818, the repeater stores the called number and the subscriber terminal Mobile Identification Number (MIN).

In steps 820–826, the repeater determines whether frequency conversion, air protocol conversion, or both, are required in order to enable a communications path between the subscriber terminal and the donor. The protocol-converting repeater may be used, for example, to serve subscriber terminals which operate in the same frequency band as the donor, but employ a different air protocol. In step 820, the repeater determines whether the donor cellular system requires the repeater to communicate with the donor using an air protocol standard different from that which the repeater uses to communicate with the subscriber terminals which it serves. If not, the method continues in step 824. If the air protocols are different, then in step 822, the repeater converts the call origination information to a format required by the donor cellular base station air protocol. The method continues in step 824.

In step 824, the repeater determines whether the donor cellular base station operates in a frequency band different from that which the served subscriber terminal uses. If not, the method continues in step 828. If the frequency bands are different, then in step 826, the repeater takes appropriate action to communicate with the donor cellular base station in the correct frequency band. The method continues in step 828.

In step 828, the repeater transmits a call origination request to the donor cellular base station as though the repeater were a subscriber terminal. In step 830, the donor cellular base station receives the call origination request and negotiates with the repeater.

In step 832, the donor and repeater each determine whether the negotiation was successful, and if so, the method continues in step 838. If the negotiation was not successful, then the method jumps to step 834. In step 834, the repeater compares a counter indicating the number of times this call origination has been attempted to a preselected limit. If the number of previous attempts does not exceed the limit, then the method returns to step 828, and the origination is attempted again. However, if the number of previous attempts exceeds the limit, then the origination fails. The method continues in step 836, and the attempted origination is disconnected.

In step 838, the donor cellular base station assigns a voice traffic channel for communication with the repeater (as though the repeater were a subscriber terminal) and advises the repeater. In step 840, the repeater allocates voice traffic equipment for communicating with the donor cellular base station on the voice traffic channel assigned by the donor. In addition, the repeater assigns a different voice traffic channel, and allocates corresponding voice traffic equipment, to communicate with the subscriber terminal, and advises the subscriber terminal of the channel assignment. In step 842, the repeater connects a voice traffic signal path between the donor cellular base station and the subscriber terminal, enabling the mobile subscriber carry on a conversation with the called subscriber via the repeater. Thereafter, the repeater monitors the call to determine when either the land-side subscriber or the mobile subscriber has ended the call; when the call is ended, the repeater disconnects the voice traffic signal path and releases the voice traffic channels for use in serving other subscribers.

The above-described embodiments of the invention are merely examples of ways in which the invention may be carried out. Other ways may also be possible, and are within the scope of the following claims defining the invention.

What is claimed is:

1. A communications repeater for establishing bidirectional communications between terminals of a first communications system and terminals of a second communications system, the first communications system employing a first air protocol, the second communications system employing a second air protocol incompatible with said first air protocol, comprising:

first repeater means for receiving first signals from a terminal of said first communications system transmitted according to said first air protocol, recovering first message information from said first signals, and retransmitting said first message information as signals in accordance with said second air protocol, where said repeater means comprises, means for acquiring a radio-frequency representation of said first signals, means responsive to said acquiring means for demodulating said first signals to obtain a base-band representation of said first message information, means responsive to said base-band representation of said first message information for modulating a third signal with said first message information according to said second air protocol, and means responsive to said third signal for transmitting a radio-frequency representation of said third signal; and second repeater means for receiving second signals from a terminal of said second communications system transmitted according to said second air protocol, recovering second message information from said second signals, and retransmitting said second message information as signals in accordance with said first air protocol.

2. The communications repeater of claim 1, further comprising:

amplifier means responsive to said base-band representation of said first message information for buffering said first message information prior to modulation.

3. The communications repeater of claim 1, further comprising:

means responsive to said base-band representation of said first message information for temporarily storing said first message information prior to modulation.

4. The communications repeater of claim 1, wherein said first message information is demodulated at a first rate, and said communications repeater further comprising means responsive to said base-band representation of said first message information for temporarily storing said first message information prior to modulation and for releasing said first message information to said modulating means at a rate different from said first rate.

5. The communications repeater of claim 1, wherein said first message information is in the form of an analog voice signal, and further comprising means for converting said first message information into a digitally encoded representation of said voice signal prior to modulation.

6. The communications repeater of claim 1, wherein said first message information is in the form of a digitally encoded voice signal, and further comprising means for converting said first message information into an analog voice signal prior to modulation.

7. The communications repeater of claim 1, wherein said first message information is in the form of a voice signal digitally encoded in a first format, and further comprising means for converting said first message information into an a voice signal digitally encoded in a second format, prior to modulation.

8. The communications repeater of claim 1, wherein said first message information contains control information needed to establish a voice traffic connection in a communications system, said control information being formatted according to said first air protocol; and said communications repeater further comprises means for converting said control information into a format according to said second air protocol, prior to modulation.

* * * * *